(12) United States Patent
Choi et al.

(10) Patent No.: US 11,272,453 B2
(45) Date of Patent: Mar. 8, 2022

(54) UPLINK CONTROL CHANNEL TRANSMITTING METHOD AND APPARATUS FOR REDUCING POWER CONSUMPTION OF USER EQUIPMENT IN WIRELESS COMMUNICATION SYSTEM

(71) Applicant: Samsung Electronics Co., Ltd., Gyeonggi-do (KR)

(72) Inventors: Seunghoon Choi, Gyeonggi-do (KR); Jinkyu Kang, Gyeonggi-do (KR); Youngbum Kim, Gyeonggi-do (KR); Taehyoung Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 70 days.

(21) Appl. No.: 16/791,548

(22) Filed: Feb. 14, 2020

(65) Prior Publication Data

US 2020/0267652 A1   Aug. 20, 2020

(30) Foreign Application Priority Data

Feb. 15, 2019  (KR) .......................... 10-2019-0017968

(51) Int. Cl.
| | |
|---|---|
| *H04W 4/00* | (2018.01) |
| *H04W 52/02* | (2009.01) |
| *H04W 72/04* | (2009.01) |
| *H04W 80/08* | (2009.01) |
| *H04L 5/00* | (2006.01) |
| *H04L 1/00* | (2006.01) |
| *H04L 1/18* | (2006.01) |

(52) U.S. Cl.
CPC ....... *H04W 52/0229* (2013.01); *H04L 1/0026* (2013.01); *H04L 1/1819* (2013.01); *H04L 5/0055* (2013.01); *H04W 52/0274* (2013.01); *H04W 72/0413* (2013.01); *H04W 80/08* (2013.01)

(58) Field of Classification Search
None
See application file for complete search history.

(56) References Cited

U.S. PATENT DOCUMENTS

| | | | | |
|---|---|---|---|---|
| 2006/0072614 A1* | 4/2006 | Ogiso | ............... | H04W 52/0225 370/474 |
| 2010/0142423 A1* | 6/2010 | Zhu | ......................... | H02J 50/20 370/311 |
| 2013/0044662 A1* | 2/2013 | Kwon | ............... | H04W 72/0453 370/311 |
| 2014/0003452 A1* | 1/2014 | Han | ...................... | H04L 1/1657 370/474 |
| 2014/0286276 A1* | 9/2014 | Lunttila | ................. | H04B 7/024 370/329 |
| 2015/0092645 A1* | 4/2015 | Tabet | .................... | H04L 1/1671 370/311 |

(Continued)

*Primary Examiner* — Brandon M Renner
(74) *Attorney, Agent, or Firm* — The Farrell Law Firm, P.C.

(57) ABSTRACT

Disclosed is a method of transmitting an uplink control channel according to a power saving mode of a user equipment, including receiving configuration information about at least one power saving mode, determining whether to apply a power saving mode of the at least one power saving mode, applying the power saving mode based on a result of the determining, and transmitting an uplink control channel based on configuration information corresponding to the applied power saving mode.

16 Claims, 12 Drawing Sheets

(56) References Cited

U.S. PATENT DOCUMENTS

| | | | |
|---|---|---|---|
| 2015/0173014 A1* | 6/2015 | Lee | H04W 74/006 |
| | | | 370/311 |
| 2015/0223285 A1* | 8/2015 | Ljung | H04W 52/0264 |
| | | | 370/311 |
| 2016/0285591 A1* | 9/2016 | Dortmund | H04L 1/1877 |
| 2016/0323820 A1* | 11/2016 | Wong | H04W 40/005 |
| 2017/0006491 A1* | 1/2017 | Chen | H04L 1/1671 |
| 2017/0164351 A1* | 6/2017 | Ghosh | H04L 5/0055 |
| 2017/0208546 A1* | 7/2017 | Park | H04W 72/042 |
| 2018/0014251 A1* | 1/2018 | Sambhwani | H04L 5/0055 |
| 2020/0229092 A1* | 7/2020 | Wu | H04W 76/11 |
| 2020/0229098 A1* | 7/2020 | Cheng | H04W 72/042 |
| 2020/0389874 A1* | 12/2020 | Lin | H04L 5/0053 |
| 2021/0105722 A1* | 4/2021 | Tsai | H04W 72/042 |

* cited by examiner

UPLINK CONTROL CHANNEL TRANSMITTING METHOD AND APPARATUS FOR REDUCING POWER CONSUMPTION OF USER EQUIPMENT IN WIRELESS COMMUNICATION SYSTEM

CROSS-REFERENCE TO RELATED APPLICATION

This application is based on and claims priority under 35 U.S.C. § 119 to Korean Patent Application No. 10-2019-0017968, filed on Feb. 15, 2019, in the Korean Intellectual Property Office, the disclosure of which is incorporated by reference herein in its entirety.

BACKGROUND

1. Field

The disclosure relates generally to a wireless communication system, and more particularly, to an uplink control channel transmitting method and apparatus for reducing power consumption of a user equipment in a wireless communication system.

2. Description of Related Art

To meet the increase in demand for wireless data traffic after the commercialization of 4th generation (4G) communication systems, considerable efforts have been made to develop improved 5th generation (5G) communication systems or pre-5G communication systems. For this reason, 5G communication systems or pre-5G communication systems are called beyond 4G network communication systems or post long term evolution (LTE) systems.

To achieve a high data rate, the implementation of 5G communication systems in an ultra-high frequency millimeter wave (mmWave) band (e.g., a 60 GHz band) is under consideration. To alleviate propagation path loss of radio waves and increase propagation distances of radio waves in an ultra-high frequency band, technologies for 5G communication systems, such as beamforming, massive multiple input multiple output (MIMO), full dimensional MIMO (FD-MIMO), array antennas, analog beamforming, and large-scale antenna technologies, have been developed.

In order to improve a system network for 5G communication systems, the development of techniques, such as evolved small cell, advanced small cell, cloud radio access network (cloud RAN), ultra-dense network, device-to-device (D2D) communication, wireless backhaul, moving network, cooperative communication, coordinated multi-points (CoMP), and reception interference cancellation, has been conducted. In addition, for 5G communication systems, hybrid frequency shift keying (FSK) and quadrature amplitude modulation (QAM) modulation (FQAM) and sliding window superposition coding (SWSC), which are advanced coding modulation (ACM) schemes; and filter bank multi-carrier (FBMC), non-orthogonal multiple access (NOMA), and sparse code multiple access (SCMA), which are advanced access techniques, have been developed.

The Internet has evolved from a human-centered connection network, through which a human generates and consumes information, to an Internet of things (IoT) network that exchanges and processes information between distributed elements such as objects. Internet of everything (IoE) technology is emerging, in which technology related to the IoT is combined with technology for processing big data through connection with a cloud server. In order to implement the IoT, various technical components are required, such as, a sensing technique, wired/wireless communication and network infrastructures, a service interfacing technique, and a security technique. In recent years, techniques including a sensor network for connecting objects, machine-to-machine (M2M) communication, and machine type communication (MTC), have been studied. In the IoT environment, intelligent Internet technology services may be provided to collect and interpret data obtained from objects connected to each other, and to create new value in human life. As existing information technology (IT) techniques and various industries converge with each other, the IoT may be applied to various fields, such as smart homes, smart buildings, smart cities, smart cars or connected cars, smart grids, health care, smart home appliances, and high quality medical services.

A radio communication system has evolved from a system providing a voice-oriented service to a broadband wireless communication system providing high-speed high quality packet data services of communication standards such as high speed packet access (HSPA) of third generation partnership project (3GPP), long term evolution (LTE) or evolved universal terrestrial radio access (E-UTRA), LTE-A, LTE-Pro, high rate packet data (HRPD) of 3GPP2, ultra mobile broadband (UMB), and institute of electrical and electronics engineers (IEEE) 802.16e.

As a representative example of the broadband wireless communication system, the LTE system employs an orthogonal frequency division multiplexing (OFDM) scheme in the downlink (DL) and employs a single carrier frequency division multiple access (SC-FDMA) scheme in the uplink (UL). The uplink refers to a radio link through which a terminal transmits data or a control signal to a base station, and the downlink refers to a radio link through which a base station transmits data or a control signal to a terminal. In the multiple access scheme as described above, data or control information of each user may be distinguished by performing assignment and operation so that time-frequency resources for carrying data or control information for each user do not overlap each other, thereby establishing orthogonality.

Future communication systems after LTE, that is, 5G communication systems have to be able to freely reflect various requirements of users and service providers. Therefore, services that satisfy various requirements have to be supported. Services considered for 5G communication systems include enhanced mobile broadband (eMBB), massive machine type communication (MMTC), and ultra reliability low latency communication (URLLC).

eMBB aims to provide a data rate that is higher than that supported by LTE, LTE-A, or LTE-Pro. For example, in 5G communication systems, eMBB has to be able to provide a peak data rate of 20 gigabits per second (Gbps) in the downlink and a peak data rate of 10 Gbps in the uplink in terms of a single base station. The 5G communication systems have to provide a peak data rate and simultaneously provide an increased user perceived data rate of the terminal. In order to satisfy such requirements, there is a need to improve various transmission and reception technologies including an improved multi-input multi-output (MIMO) transmission technology. In a 2 GHz band used by LTE, signals are transmitted using up to 20 MHz transmission bandwidth. 5G communication systems use a frequency bandwidth wider than 20 MHz in a 3-6 GHz or 6 GHz or higher frequency bands. Therefore, it is possible to satisfy the data rate required by 5G communication systems.

Concurrently, MMTC is being considered so as to support application services such as IoT in 5G communication systems. In order to efficiently provide IoT, MMTC needs to support access of a massive terminal in a cell, improve coverage of the terminal, improve battery time, and reduce costs of the terminal. Because IoT is attached to various sensors and various devices to provide a communication function, IoT has to be able to support a large number of terminals (e.g., 1,000,000 terminals/km$^2$) in a cell. Due to the nature of the service, the terminal supporting MMTC is likely to be located in a shaded area that is not covered by the cell, such as the basement of a building. Therefore, wider coverage than other services provided by the 5G communication systems may be required. The terminal supporting MMTC has to be configured as an inexpensive terminal, and it is difficult to frequently replace a battery of the terminal. Therefore, a very long battery life time such as 10 to 15 years may be required.

in addition, URLLC is a cellular-based wireless communication service used for a specific purpose, such as remote control for robots or machinery, industrial automation, unmanned aerial vehicles, remote health care, and emergency alerts Therefore, communication provided by URLLC has to provide very low latency and very high reliability. For example, a service supporting URLLC has to satisfy air interface latency of less than 0.5 milliseconds and simultaneously has a packet error rate of $10^{-5}$ or less. Therefore, for services supporting URLLC, the 5G systems have to provide a smaller transmit time interval (TTI) than other services and simultaneously require a design matter that has to assign a wide resource in a frequency band so as to ensure reliability of a communication link.

Various attempts are being made to apply 5G communication systems to IoT networks. For example, technologies related to sensor networks, M2M communication, and MTC are implemented by using 5G communication technology including beamforming, MIMO, and array antennas. The application of the cloud RAN as a big data processing technique described above may be an example of convergence of 5G communication technology and IoT technology.

While various services may be provided as wireless communication systems are developing, power consumption of devices employing these services continues to be excessive, which is an inconvenience to users and is cost-prohibitive. As such, there is a need in the art for a method of effectively providing such services while reducing power consumption in these electronic devices.

SUMMARY

Aspects of the disclosure are to address at least the above-mentioned problems and/or disadvantages and to provide at least the advantages described below. Accordingly, an aspect of the disclosure is to provide an apparatus and method capable of effectively providing services and reducing power consumption of electronic devices in a mobile communication system.

In accordance with an aspect of the disclosure, a method of transmitting an uplink control channel according to a power saving mode of a user equipment (UE) includes receiving configuration information about at least one power saving mode, determining whether to apply a power saving mode of the at least one power saving mode, applying the power saving mode based on a result of the determining, and transmitting an uplink control channel based on configuration information corresponding to the applied power saving mode.

In accordance with another aspect of the disclosure, a UE for transmitting an uplink control channel according to a power saving mode includes a transceiver, and a processor connected to the transceiver and configured to receive configuration information about at least one power saving mode, determine whether to apply a power saving mode of the at least one power saving mode, apply the power saving mode based on a result of the determining, and transmit an uplink control channel based on configuration information corresponding to the applied power saving mode.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
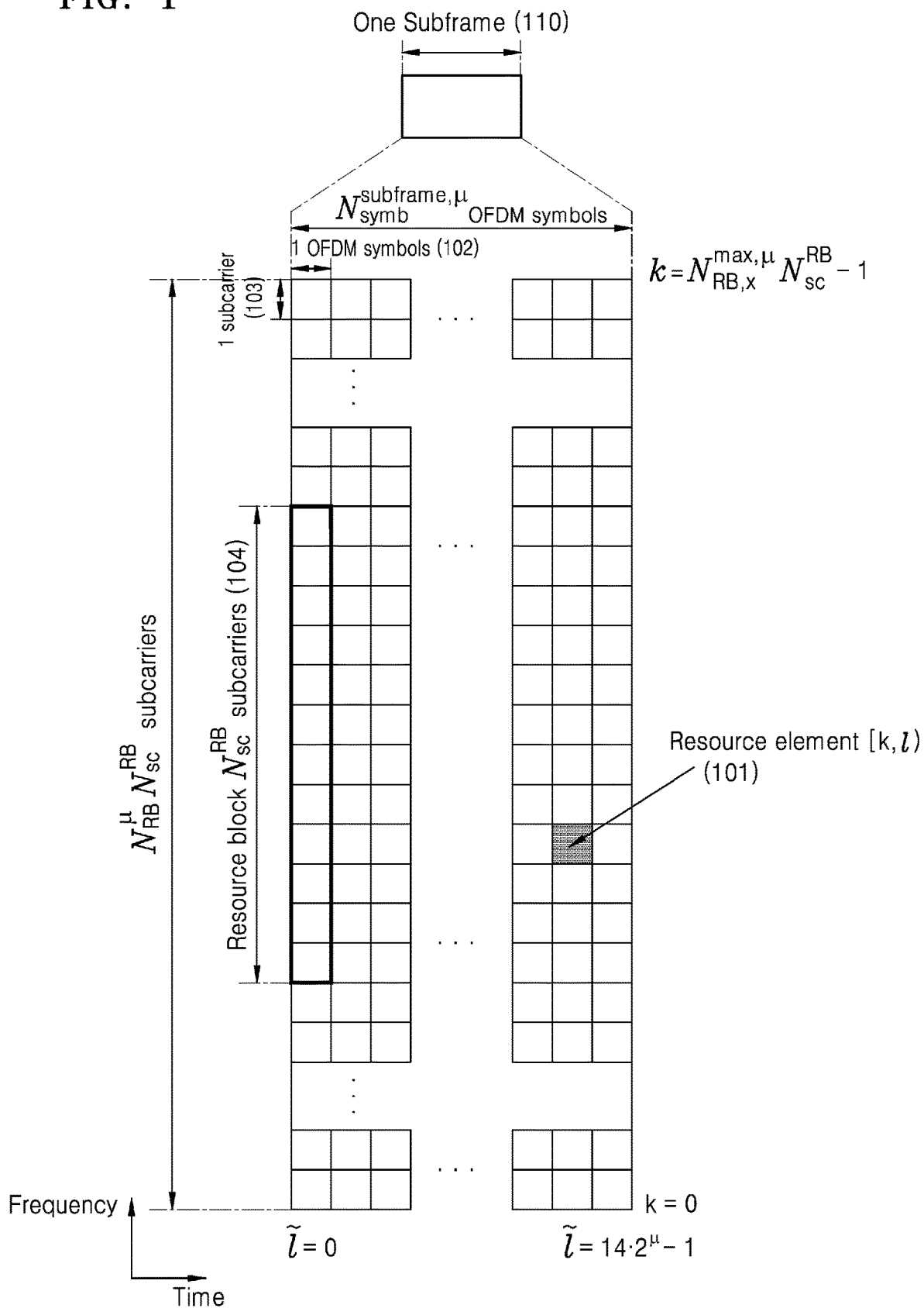
FIG. 1 illustrates a basic structure of a time-frequency domain in 5G, according to an embodiment.

Hereinafter, embodiments of the disclosure will be described in detail with reference to the accompanying drawings.

A detailed description of well known functions and/or configurations will be omitted for the sake of clarity and conciseness.

Some elements in the accompanying drawings are exaggerated, omitted, or schematically illustrated. The size of each element may not reflect the actual size. In each drawing, the same reference numerals are assigned to the same or corresponding elements.

The advantages and features of the disclosure and methods for achieving them will become more apparent from the following embodiments of the disclosure, which are described in detail in conjunction with the accompanying drawings. However, it will be understood that the disclosure is not limited to the following embodiments, and various modifications may be made without departing from the scope of the disclosure. The embodiments set forth herein are provided so that the disclosure will fully convey the concept of the disclosure to those of ordinary skill in the art.

The terms as used herein are those defined by considering functions in the disclosure, but the terms may vary according to the intention of users or those of ordinary skill in the art. Therefore, the definitions should be made based on the contents throughout the specification.

Throughout the disclosure, the expression "at least one of a, b or c" indicates only a, only b, only c, both a and b, both a and c, both b and c, all of a, b, and c, or variations thereof.

Examples of a terminal may include a UE, a mobile station (MS), a cellular phone, a smartphone, a computer, and a multimedia system capable of performing a communication function.

In the disclosure, a controller may also be referred to as a processor.

Throughout the specification, a layer (or a layer apparatus) may also be referred to as an entity.

Hereinafter, a base station is a subject that performs resource assignment of a terminal and may be at least one of a gNode B, eNode B, Node B, a base station (BS), a radio access unit, a base station controller, or a node on a network. In the disclosure, downlink (DL) is a radio transmission path of a signal transmitted from a base station to a terminal, and uplink (UL) is a radio transmission path of a signal transmitted from a terminal to a base station. Although a long-term evolution (LTE) or LTE-advanced (LTE-A) system may be described below as an example, embodiments of the disclosure may be applicable to other communication systems having a similar technical background or channel form, such as the 5G mobile communication technology (5G, new radio, NR) developed after LTE-A. 5G may be a concept including existing LTE, LTE-A, and similar other services. The disclosure may be applicable to other communication systems through some modifications without departing from the scope of the disclosure.

It will be understood that the respective blocks of the flowcharts and the combinations of the flowcharts may be performed by computer program instructions. Because these computer program instructions may be embedded in a processor of a general-purpose computer, a special-purpose computer, or other programmable data processing apparatuses, the instructions executed through the processor of the computer or apparatus generates modules for performing the functions described in the flowchart block(s). As these computer program instructions may also be stored in a computer-usable or computer-readable memory that may direct the computer or other programmable data processing apparatus so as to implement functions in a particular manner, the instructions are also capable of producing an article of manufacture containing instruction modules for performing the functions described in the flowchart block(s). As the computer program instructions may also be mounted on the computer or other programmable data processing apparatus, the instructions for executing the computer or other programmable data processing apparatus by generating a computer-implemented process by performing a series of operations on the computer or other programmable data processing apparatus may provide operations for executing the functions described in the flowchart block(s).

Each block may represent a part of a module, segment, or code that includes one or more executable instructions for executing a specified logical function(s). In some alternative implementations, the functions noted in the blocks may occur out of order. For example, two blocks illustrated in succession may in fact be executed substantially concurrently, or may be executed in the reverse order, depending on the functions involved.

The term "unit" as used herein performs certain functions and refers to a software element or a hardware element, such as field programmable gate array (FPGA) or application specific integrated circuit (ASIC), but is not limited to software or hardware. The term "unit" may be configured in an addressable storage medium or may be configured to reproduce one or more processors. Therefore the term "unit" includes elements, such as software elements, object-oriented software elements, class elements, and task elements, processes, functions, attributes, procedures, subroutines, segments of program codes, drivers, firmware, microcodes, circuits, data, databases, data structures, tables, arrays, and variables.

Functions provided in the elements and the units may be combined with fewer elements and units or may be separated from additional elements and units. In addition, the elements and the units may be implemented to reproduce one or more central processing units (CPUs) in the device or secure multimedia card. The unit may include one or more processors.

Services of 5G, including but not limited to eMBB, URLLC, and MMTC, may be multiplexed and transmitted in a single system. In this case, different transmission and reception technologies and transmission and reception parameters may be used between services so as to satisfy different requirements of the respective services.

In the 5G communication systems, a method of adjusting layer 1 (L1) signaling with respect to various transmission and reception parameters has been discussed so as to reduce power consumption of the terminal. The L1 signaling may include a wake-up signal (WUS) indicating to perform monitoring on a physical downlink control channel (PDCCH) of the terminal, a signal (referred to as a go-to-sleep signal (GTS)) indicating not to perform monitoring on the PDCCH, or a power saving signal (PoSS). The base station may transmit a WUS to the terminal, and the terminal may monitor the PDCCH from the time point after the WUS is detected. The base station may transmit a GTS to the terminal, which may not perform monitoring on the PDCCH for a specific time from the time point after the GTS is detected.

The disclosure provides a method by which a terminal receiving an L1 signal transmits an uplink control channel including hybrid automatic repeat request Acknowledgement (HARQ-ACK) feedback or the like, and an uplink control channel transmitting method and apparatus for reducing power consumption of the terminal. Therefore, the power consumption of the terminal may be minimized by applying the uplink control channel transmitting method and apparatus disclosed herein.

FIG. 1 illustrates a basic structure of a time-frequency domain, which is a radio resource domain in which data or a control channel is transmitted, in a 5G system according to an embodiment.

In FIG. 1, a horizontal axis represents a time domain and a vertical axis represents a domain. A basic unit of resources in the time and frequency domains is a resource element (RE) 101, which may be defined as one orthogonal frequency division multiplexing (OFDM) symbol 102 on the time axis and one subcarrier 103 on the frequency axis. $N_{sc}^{RB}$ (e.g., 12) consecutive REs in the frequency domain may constitute one resource block (RB) 104.

Figure 2:
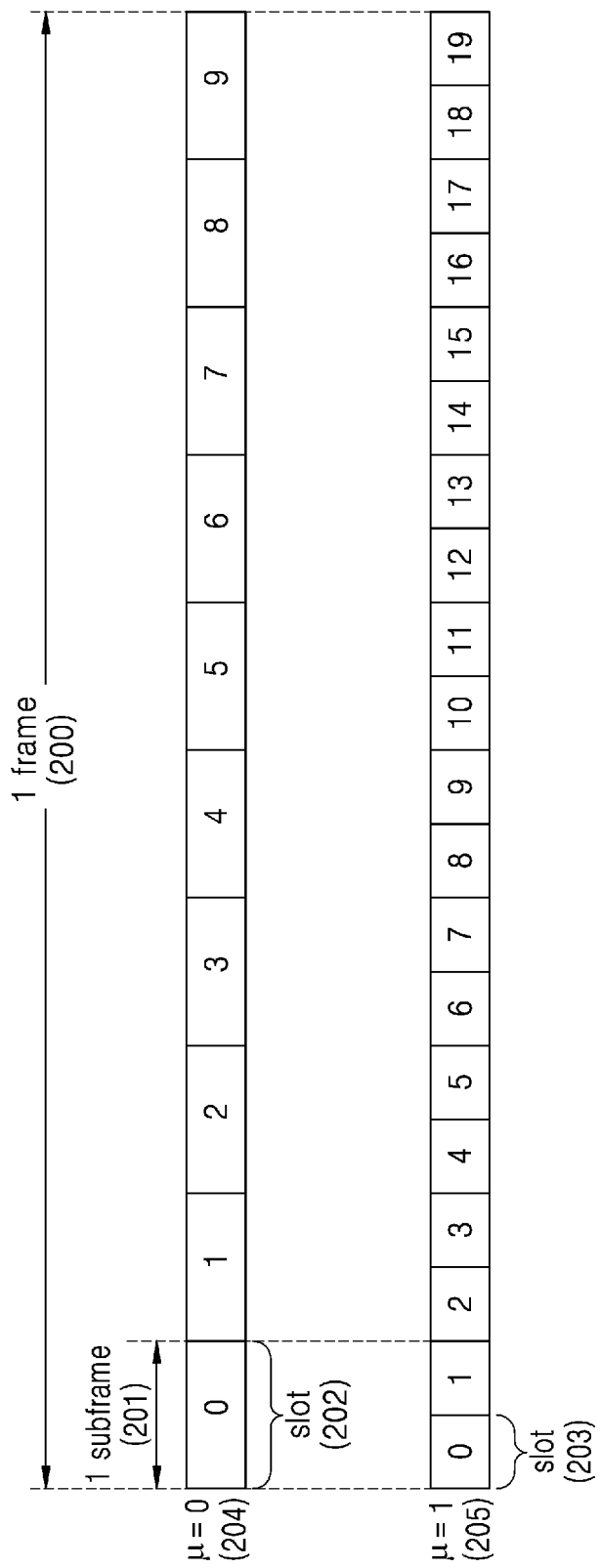
FIG. 2 illustrates a frame, a subframe, and a slot structure in 5G, according to an embodiment.

FIG. 2 illustrates a slot structure considered in a 5G system, according to an embodiment.

An example of a structure of a frame 200, a subframe 201, and a slot 202 is illustrated in FIG. 2. Frame 200 may be defined as 10 ms, and subframe 201 may be defined as 1 ms. Therefore, one frame 200 may include a total of 10 subframes 201. Slot 202 or 203 may be defined as 14 OFDM symbols (i.e. number ($N_{symb}^{slot}$) of symbols per slot=14). Subframe 201 may include one or more slots 202 and 203. The number of slots 202 and 203 per subframe 201 may be changed according to setting values (p) 204 and 205 for a subcarrier spacing. FIG. 2 illustrates when the setting value for the subcarrier spacing is µ=0 (204) and µ=1 (205). When µ=0 (204), subframe 201 may include one slot 202, and when µ=1 (205), subframe 201 may include two slots 203. That is, the number ($N_{slot}^{subframe,\mu}$) of slots per one subframe may be changed according to the setting value µ for the subcarrier spacing. Therefore, the number ($N_{slot}^{frame,\mu}$) of slots per frame may be changed. $N_{slot}^{subframe,\mu}$ and $N_{slot}^{frame,\mu}$ according to each setting value p for the subcarrier spacing may be defined as Table 1 below.

TABLE 1

| µ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Figure 3:
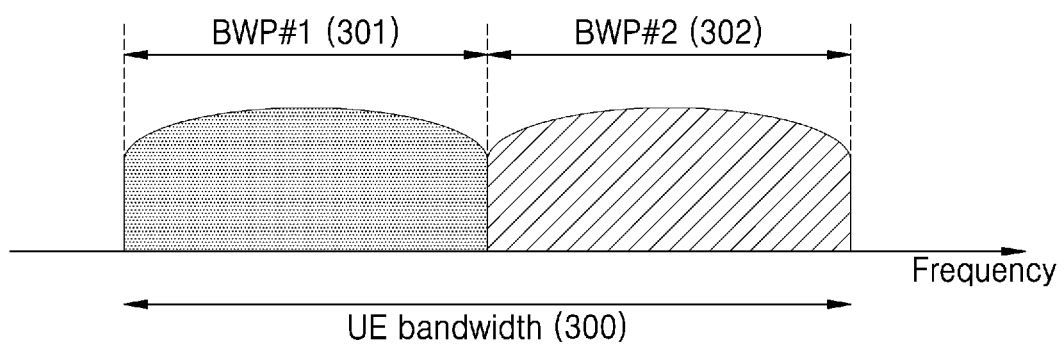
FIG. 3 illustrates an example of a bandwidth part configuration in 5G, according to an embodiment.

FIG. 3 illustrates an example of a bandwidth part (BWP) configuration in a 5G communication system, according to an embodiment.

In FIG. 3, a UE bandwidth 300 is configured as two BWPs, that is, BWP #1 301 and BWP #2 302. A base station may configure one or more BWPs to the UE and may configure the following information in Table 2, shown below, with respect to each BWP.

TABLE 2

| BWP ::= | SEQUENCE{ |
|---|---|
| bwp-Id | BWP-Id, |
| locationAndBandwidth | INTEGER ( 1..65536 ), |
| subcarrierSpacing | ENUMERATED {n0, n1, n2, n3, n4, n5}, |
| cyclicPrefix | ENUMERATED { extended } |
| } | |

The disclosure is not limited to the above example. In addition to the configuration information, various parameters related to the BWP may be configured to the UE. The base station may transmit the information to the UE through higher layer signaling radio resource control (RRC) signaling. At least one of the configured one or more BWPs may be activated. Whether to activate the configured BWP may be transmitted from the base station to the UE semi-statically through the RRC signaling or dynamically through downlink control information (DCI).

The UE before RRC connection may be configured with an initial BWP for initial access from the base station through a master information block (MIB). More specifically, the UE may receive configuration information about a search space and a control resource set (CORESET) through which a PDCCH for receiving system information necessary for initial access (remaining system information (RMSI) or system information block 1 (SIB1)) may be transmitted through the MIB in an initial access operation. The CORESET and the search space, which are configured as MIBs, may be regarded as identity (ID) 0, respectively. The base station may notify the UE of configuration information, such as frequency assignment information, time assignment information, and numerology for the control resource set #0 through the MIB. The base station may notify the UE of configuration information for monitoring period and occasion for the control resource set #0, that is, configuration information for the search space #0, through the MIB. The UE may regard the frequency domain configured as the control resource set #0 acquired from the MIB as the initial BWP for initial access. In this case, the ID of the initial BWP may be regarded as zero.

The configuration of the BWP supported by 5G may be used for various purposes.

When a bandwidth supported by the UE is less than a system bandwidth, support may be provided through the BWP configuration. For example, the base station may configure a frequency position (configuration information 2) of the BWP to the UE so that the UE may transmit and receive data at a specific frequency position within the system bandwidth.

The base station may configure a plurality of BWPs to the UE for the purpose of supporting different numerologies. For example, two BWPs may be configured to a subcarrier spacing of 15 kilohertz (kHz) and a subcarrier spacing of 30 kHz, respectively, so as to support, to the UE, data transmission and reception using a subcarrier spacing of 15 kHz and a subcarrier spacing of 30 kHz. Different BWPs may be subjected to frequency division multiplexing. When intending to transmit and receive data at a specific subcarrier spacing, the BWP configured at the corresponding subcarrier spacing may be activated.

The base station may configure the BWPs with bandwidths of different sizes to the UE for the purpose of reducing power consumption of the UE. For example, very high power consumption is realized when the UE supports a very large bandwidth a bandwidth of 100 MHz, and always transmits and receives data at the corresponding bandwidth. In particular, monitoring of unnecessary downlink control channels at a large bandwidth of 100 MHz in the absence of traffic may be very inefficient in terms of power consumption. In order to reduce power consumption of the UE, the base station may configure a BWP of a relatively small bandwidth a BWP of 20 MHz. In the absence of traffic, the UE may perform a monitoring operation in a BWP of 20 MHz. When data is generated, the UE may transmit and receive data in a BWP of 100 MHz according to an indication of the base station.

In the method of configuring the BWP, the UEs before the RRC connection may receive configuration information about the initial BWP through the MIB in the initial connection operation. More specifically, the UE may be configured with a CORESET for a downlink control channel through which DCI for scheduling a SIB may be transmitted from a MIB of a physical broadcast channel (PBCH). The bandwidth of the control resource set configured to the MIB may be regarded as the initial BWP. The UE may receive, through the configured initial BWP, a physical downlink shared channel (PDSCH) through which the SIB is transmitted. The initial BWP may be used for other system information (OSI), paging, and random access as well as the reception of the SIB.

A synchronization signal (SS)/PBCH block in 5G refers to a physical layer channel block including a primary SS (PSS), a secondary SS (SSS), and a PBCH. Specifically, the SS/PBCH block is as follows.

PSS: A signal that is a reference for downlink time/frequency synchronization and provides some information of a cell ID.

SSS: A signal that is a reference for downlink time/frequency synchronization and provides the remaining cell ID information that is not provided by the PSS. In addition, the SSS may serve as a reference signal for demodulation of the PBCH.

PBCH: Provides essential system information necessary for transmitting and receiving a data channel and a control channel of a UE. The essential system information may include such information as search space related control information indicating radio resource mapping information of a control channel, and scheduling control information for a separate data channel for transmitting system information.

SS/PBCH block: Includes a combination of a PSS, an SSS, and a PBCH. One or more SS/PBCH blocks may be transmitted within 5 ms, and the one or more transmitted SS/PBCH blocks may be identified by indices.

The UE may detect the PSS and the SSS in the initial access operation and may decode the PBCH. The UE may acquire the MIB from the PBCH and may be configured with the control resource set #0 therefrom. The UE may monitor the control resource set #0 on the assumption that a demodulation reference signal (DMRS) transmitted in the selected SS/PBCH block and the control resource set #0 is quasi-colocated (QCLed). The UE may receive system information as downlink control information transmitted from the control resource set #0. The UE may acquire, from the received system information, configuration information related to a random access channel (RACH) necessary for initial access. The UE may transmit a physical RACH (PRACH) to the base station by taking into account the selected SS/PBCH index, and the base station receiving the PRACH may acquire information about an SS/PBCH block index selected by the UE. The base station may know which block is selected among the SS/PBCH blocks by the UE and may know that the control resource set #0 associated with the selected block is monitored.

In the 5G system, scheduling information about uplink data (or physical uplink shared channel (PUSCH)) or downlink data (or PDSCH) is transmitted from the base station to the UE through the DCI. The UE may monitor a fallback DCI format and a non-fallback DCI format with respect to the PUSCH or PDSCH. The fallback DCI format may include a fixed field predefined between the base station and the UE, and the non-fallback DCI format may include a configurable field.

The DCI may be transmitted through a PDCCH after channel coding and modulation is performed thereon. A cyclic redundancy check (CRC) is attached to a DCI message payload and may be scrambled by a radio network temporary identifier (RNTI) corresponding to the identity of the UE. Different RNTIs are used according to the purpose of the DCI message, such as a UE-specific data transmission, a power control command, or a random access response. That is, the RNTI may not explicitly transmitted, but may be included in a CRC calculation process and then transmitted. When receiving a DCI message transmitted on the PDCCH, the UE may check a CRC by using an assigned RNTI. When a CRC check result is correct, the UE may know that the corresponding message has been transmitted to the UE.

For example, a DCI that schedules a PDSCH for system information (SI) may be scrambled by an SI-RNTI. A DCI that schedules a PDSCH for a random access response (RAR) message may be scrambled by an RA-RNTI. A DCI that schedules a PDSCH for a paging message may be scrambled by a P-RNTI. A DCI that notifies a slot format indicator (SFI) may be scrambled by an SFI-RNTI. A DCI that notifies transmit power control (TPC) may be scrambled by a TPC-RNTI. A DCI that schedules UE-specific PDSCH or PUSCH may be scrambled by a C-RNTI (cell RNTI).

A DCI format 0_0 may be used as a fallback DCI that schedules a PUSCH. In this case, a CRC may be scrambled by a C-RNTI. The DCI format 0_0 in which the CRC is scrambled by the C-RNTI may include, but is not limited to, the information in Table 3 as follows.

TABLE 3

Identifier for DCI formats - [1] bit
Frequency domain resource assignment -
[[$\log_2( N_{RB}^{UL,BWP}( N_{RB}^{UL,BWP} + 1)/2)$]] bits
Time domain resource assignment - X bits
Frequency hopping flag - 1 bit.
Modulation and coding scheme - 5 bits
New data indicator - 1 bit
Redundancy version -2 bits
HARQ process number - 4 bits
TPC command for scheduled PUSCH - [2] bits
UL/SUL indicator - 0 or 1 bit A DCI format 0_1 may be used as a non-fallback DCI that schedules a PUSCH. In this case, a CRC may be scrambled by a C-RNTI. The DCI format 0_1 in which the CRC is scrambled by the C-RNTI may include, but is not limited to, the information in Table 4 as follows.

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
   For resource allocation type 0, [$N_{RB}^{UL,BWP}/P$] bits
   For resource allocation type 1, [$\log_2(N_{RB}^{UL,BWP}(N_{RB}^{UL,BWP} + 1)/2)$] bits
Time domain resource assignment - 1, 2, 3, or 4 bits
VRB-to-PRB mapping - 0 or 1 bit, only for resource allocation type 1.
   0 bit if only resource allocation type 0 is configured;
   1 bit otherwise.
Frequency hopping flag - 0 or 1 bit, only for resource allocation type 1.
   0 bit if only resource allocation type 0 is configured;
   1 bit otherwise.
Modulation and coding scheme - 5 bits
New data indicator - 1 bit
Redundancy version - 2 bits
HARQ process number - 4 bits
1st downlink assignment index - 1 or 2 bits
   1 bit for semi-static HARQ-ACK codebook;
   2 bits for dynamic HARQ-ACK codebook with single HARQ-ACK codebook.
2nd downlink assignment index - 0 or 2 bits
   2 bits for dynamic HARQ-ACK codebook with two HARQ-ACK sub-codebooks;
   0 bit otherwise.
TPC command for scheduled PUSCH - 2 bits SRS resource indicator -

$$\left\lceil \log_2\left(\sum_{k=1}^{L_{max}} \binom{N_{SRS}}{k}\right)\right\rceil \text{ or } \lceil \log_2(N_{SRS})\rceil \text{ bits}$$

$$\left\lceil \log_2\left(\sum_{k=1}^{L_{max}} \binom{N_{SRS}}{k}\right)\right\rceil \text{ bits}$$

for non-codebook based PUSCH transmission;
   $\lceil \log_2(N_{SRS})\rceil$ bits for codebook based PUSCH transmission.

Precoding information and number of layers - up to 6 bits
Antenna ports - up to 5 bits TABLE 4-continued SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit A DCI format 1_0 may be used as a fallback DCI that schedules a PDSCH. In this case, a CRC may be scrambled by a C-RNTI. The DCI format 1_0 in which the CRC is scrambled by the C-RNTI may include, but is not limited to, the information in Table 5 as follows.

TABLE 5

Identifier for DCI formats - [1] bit
Frequency domain resource assignment-
[⌈log$_2$(N$_{RB}^{DL,BWP}$( N$_{RB}^{DL,BWP}$ + 1)/2)⌉ ] bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator -3 bits
PDSCH-to-HARQ feedback timing indicator -[3] bits A DCI format 1_1 may be used as a non-fallback DCI that schedules a PDSCH. In this case, a CRC may be scrambled by a C-RNTI. The DCI format 1_1 in which the CRC is scrambled by the C-RNTI may include, but is not limited to, the information in Table 6 as follows.

TABLE 6

Carrier indicator - 0 or 3 bits
Identifier for DCI formats - [1] bits
Bandwidth part indicator - 0, 1 or 2 bits
Frequency domain resource assignment
    For resource allocation type 0, ⌈N$_{RB}^{DL,BWP}$/ P⌉ bits
    For resource allocation type 1, ⌈log$_2$(N$_{RB}^{DL,BWP}$( N$_{RB}^{DL,BWP}$ + 1)/2)⌉ bits
Time domain resource assignment-1, 2, 3, or 4 bits
VRB-to-PRB mapping - 0 or 1 bit, only for resourceallocation type 1.
    0 bit if only resource allocation type 0 is configured;
    1 bit otherwise.
PRB bundling size indicator - 0 or 1 bit
Rate matching indicator - 0, 1, or 2 bits
ZP CSI-RS trigger - 0, 1, or 2 bits
For transport block 1:
   Modulation and coding scheme - 5 bits
   New data indicator- 1 bit
   Redundancy version - 2 bits
For transport block 2:
Modulation and coding scheme - 5 bits
New data indicator- 1 bit
Redundancy version- 2 bits
HARQ process number- 4 bits
Downlink assignment index- 0 or 2 or 4 bits
TPC command for scheduled PUCCH - 2 bits
PUCCH resource indicator - 3 bits
PDSCH-to-HARQ_feedback timing indicator- 3 bits
Antenna ports - 4, 5 or 6 bits
Transmission configuration indication — 0 or 3 bits
SRS request- 2 bits
CBG transmission information - 0, 2, 4, 6, or 8 bits
CBG flushing out information - 0 or 1 bit
DMRS sequence initialization - 1 bit In the DCI format 0_0 and the DCI format 1_0, and a DCI format 2_2 and a DCI format 2_3, which are to be described below, the sizes A of the DCI message payloads may be equal to each other. In the DCI format 0_1 and the DCI format 1_1, and a DCI format 2_0 and a DCI format 2_1, which are to be described below, the sizes of the DCI message payloads may be differently configured from the base station. That is, when the size of the DCI message payload of the DCI format 0_1 is B, the size of the DCI message payload of the DCI format 1_1 is C, the size of the DCI message payload of the DCI format 2_0 is D, and the size of the DCI message payload of the DCI format 2_1 is E, A, B, C, D, and E may be differently configured. Therefore, the UE may monitor DCI formats on the assumption of the sizes A, B, C, D, and E of up to five different DCI message payloads.

Figure 4:
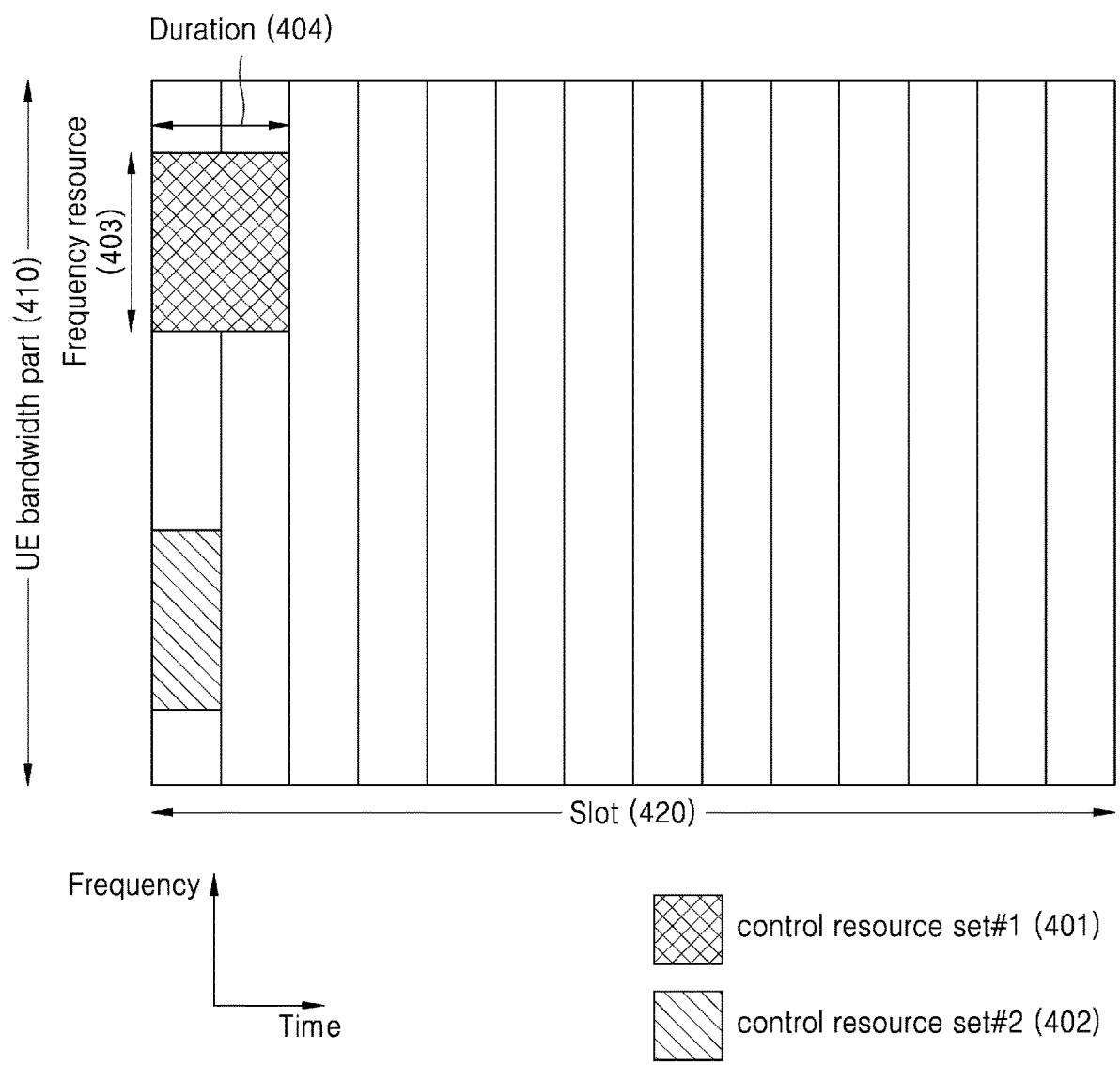
FIG. 4 illustrates an example of a control resource set configuration of a downlink control channel in 5G, according to an embodiment.

FIG. 4 illustrates an example of a CORESET to which a downlink control channel is transmitted in a 5G wireless communication system, according to an embodiment. In FIG. 4, a UE BWP 410 is configured on a frequency axis and two control resource sets (control resource set #1 401 and control resource set #2 402) are configured in one slot 420 on a time axis. The control resource sets 401 and 402 may be configured to specific frequency resources 403 within the entire UE BWP 410 on the frequency axis. One or more OFDM symbols may be configured on the time axis and may be defined as a control resource set duration 404. In FIG. 4, the control resource set #1 401 is configured with the control resource set duration of two symbols, and the control resource set #2 402 is configured with the control resource set duration of one symbol.

The base station may configure the control resource set of 5G to the UE through higher layer signaling (for example, SI, MIB, and RRC signaling) by providing information such as a control resource set identity, a frequency position of the control resource set, and a symbol duration of the control resource set. For example, the information in Table 7 shown below, may be included. However, the disclosure is not limited thereto.

TABLE 7

```
ControlResourceSet ::=              SEQUENCE{
   -- Corresponds to L1 parameter 'CORESET-ID'
   controlResourceSetId             ControlResourceSetId,
   ( control resource set identity )
   frequencyDomainResources         BIT STRING ( SIZE ( 45 ) ) ,
   Duration                         INTEGER ( 1..maxCoReSetDuration ) ,
   ( time axis resource assignment information )
   cce-REG-MappingType              CHOICE{
     Interleaved                    SEQUENCE{
       reg-BundleSize               ENUMERATED {n2, n3, n6},
       precoderGranularity          ENUMERATED {sameAsREG-bundle,
   allContiguousRBs},
       interleaversize              ENUMERATED {n2, n3, n6},
       shiftIndex
       INTEGER ( 0..maxNrofPhysicalResourceBlocks-1 )
   OPTIONAL
       ( interleaver shift )
     },
     nonInterleaved                 NULL
   },
   tci-StatesPDCCH                  SEQUENCE ( SIZE
       ( 1..maxNrofTCI-
   StatesPDCCH ) ) OF TCI-StateId        OPTIONAL,
       ( QCL configuration information )
   tci-PresentInDCI                 ENUMERATED {enabled}
   OPTIONAL, -- Need S
   }
```

In Table 7, tci-StatesPDCCH (referred to as TCI state) configuration information may include information about one or more SS/PBCH block indices having a QCLed relationship with a DMRS transmitted in the corresponding control resource set or a channel state information reference signal (CSI-RS) Index.

Figure 5:
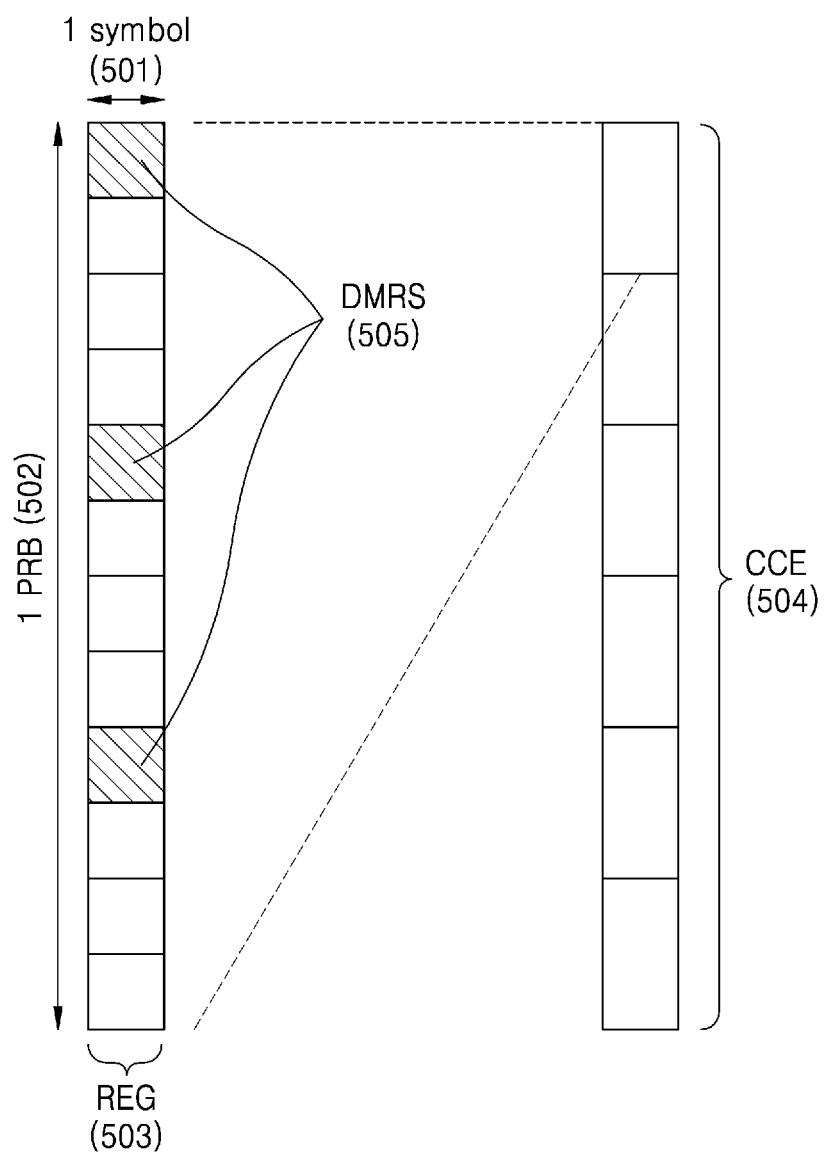
FIG. 5 illustrates a structure of a downlink control channel in 5G, according to an embodiment.

FIG. 5 illustrates an example of a basic unit of time and frequency resources constituting a downlink control channel that is usable in 5G, according to an embodiment. Referring to FIG. 5, the basic unit of the time and frequency resources constituting the control channel may be referred to as a resource element group (REG) 503, defined as one OFDM symbol 501 on a time axis and one physical resource block (PRB) 502, that is, 12 subcarriers, on a frequency axis. The base station may concatenate the REG 503 to configure a downlink control channel assignment unit.

As illustrated in FIG. 5, when a basic unit to which a downlink control channel is assigned in 5G is referred to as a control channel element (CCE) 504, one CCE 504 may include a plurality of REGs 503. In FIG. 5, when the REG 503 includes 12 REs and one CCE 504 includes six REGs 503, one CCE 504 may include 72 REs. When the downlink control region (e.g., downlink control resource set) is configured, the downlink control region may include a plurality of CCEs 504. A specific downlink control channel may be transmitted after being mapped to one or more CCEs 504 according to an aggregation level (AL) in the downlink control region. The CCEs 504 in the control region are distinguished by numbers. In this case, the numbers of the CCEs 504 may be assigned according to a logical mapping scheme.

The basic unit of the downlink control channel illustrated in FIG. 5, that is, the REG 503, may include both REs to which the DCI is mapped and a region to which the DMRS 505, which is the reference signal for decoding the DCI, is mapped. As illustrated in FIG. 5, three DMRSs 505 may be transmitted in one REG 503.

The number of CCEs necessary for transmitting the PDCCH may be 1, 2, 4, 8, or 16 according to the AL. A different number of CCEs may be used to implement link adaptation of the downlink control channel. For example, when AL=L, one downlink control channel may be transmitted through L CCEs. The UE has to detect a signal when the UE does not know accurate position information about the downlink control channel and the AL, and a search space representing a set of CCEs is defined for blind decoding. The search space is a set of downlink control channel candidates including CCEs that the UE has to attempt to decode at a given AL. Because there are various ALs that make one bundle from 1, 2, 4, 8, and 16 CCEs, the UE may have a plurality of search spaces. A search space set may be defined as a set of search spaces at all configured ALs.

The search spaces may be classified into common search spaces and UE-specific search spaces. A certain group of UEs or all the UEs may examine the common search space of the PDCCH so as to receive cell common control information, such as dynamic scheduling of system information or a paging message. For example, PDSCH scheduling assignment information for transmission of the SIB including cell operator information may be received by examining the common search space of the PDCCH. Since a certain group of UEs or all the UEs have to receive the PDCCH, the common search space may be defined as a set of appointed CCEs. Scheduling allocation information about the UE-specific PDSCH or PUSCH may be received by examining the UE-specific search space of the PDCCH. The UE-specific search space may be UE-specifically defined as a function of the UE identity and various system parameters.

In 5G, the parameter for the search space of the PDCCH may be configured from the base station to the UE through higher layer signaling. For example, the base station may configure, to the UE, the number of PDCCH candidates at each aggregation level L, the monitoring periodicity for the search space, the monitoring occasion of symbol units in the slots for the search space, the search space type (common search space or UE-specific search space), the combination of RNTI and DCI format to be monitored in the search space, and the control region index to monitor the search space. For example, the information may include, but is not limited to, the information in Table 8 as follows.

TABLE 8

```
SearchSpace ::=                              SEQUENCE {
  -- Identity of the search space. SearchSpaceId = 0 identifies the SearchSpace
  configured via PBCH (MIB) or ServingCellConfigCommon.
    searchSpaceId                            SearchSpaceId,
    (search space identity)
    controlResourceSetId                     ControlResourceSetId,
    (control resource set identity)
    monitoringSlotPeriodicityAndOffset       CHOICE {
    (monitoring slot level periodicity)
      sl1                                    NULL,
      sl2                                    INTEGER (0..1),
      sl4                                    INTEGER (0..3),
      sl5                                    INTEGER (0..4),
      sl8                                    INTEGER (0..7),
      sl10                                   INTEGER (0..9),
      sl16                                   INTEGER (0..15),
      sl20                                   INTEGER (0..19)
    }
    duration(monitoring duration)            INTEGER (2..2559)
    monitoringSymbolsWithinSlot                BIT STRING (SIZE (14))
    (monitoring symbol in slot)
    nrofCandidates                           SEQUENCE {
    (number of PDCCH candidates for each
    aggregation level)
      aggregationLevel1                      ENUMERATED {n0, n1, n2, n3, n4, n5, n6, n8},
      aggregationLevel2                      ENUMERATED {n0, n1, n2, n3, n4, n5, n6, n8},
      aggregationLevel4                      ENUMERATED {n0, n1, n2, n3, n4, n5, n6, n8},
      aggregationLevel8                      ENUMERATED {n0, n1, n2, n3, n4, n5, n6, n8},
      aggregationLevel16                     ENUMERATED {n0, n1, n2, n3, n4, n5, n6, n8}
    },
    searchSpaceType                          CHOICE {
    (search space type)
      -- Configures this search space as common search space (CSS) and DCI formats
      to monitor.
      common                                 SEQUENCE {
      (common search space)
      }
      ue-Specific                            SEQUENCE {
      (UE-specific search space)
        -- Indicates whether the UE monitors in this USS for DCI formats 0-0 and
      1-0 or for formats 0-1 and 1-1.
        formats                              ENUMERATED {formats0-0-And-1-0,
        formats 0-1-And-1-1},
        ...
      }
}
```

The base station may configure one or more search space sets to the UE according to configuration information. The base station may configure a search space set 1 and a search space set 2 to the UE. The base station may configure search space set 1 to the UE so that DCI format A scrambled by an X-RNTI is monitored in the common search space. The base station may configure search space set 2 to the UE so that DCI format A scrambled by an X-RNTI is monitored in the UE-specific search space.

According to the configuration information, one or more search space sets may be present in the common search space or the UE-specific search space. For example, search space set #1 and search space set #2 may be configured as the common search space, and search space set #3 and search space set #4 may be configured as the UE-specific search space.

In the common search space, the combinations of the DCI format and the RNTI that may be monitored include, but are not limited to, the following combinations.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the combinations of the DCI format and the RNTI that may be monitored include, but are not limited to, the following combinations.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the definitions and usages described below.

C-RNTI (cell RNTI): For UE-specific PDSCH scheduling

TC-RNTI (temporary cell RNTI): For UE-specific PDSCH scheduling

CS-RNTI (configured scheduling RNTI): For semi-statically configured UE-specific PDSCH scheduling RA-RNTI (random access RNTI): For PDSCH scheduling in random access operation P-RNTI (paging RNTI): For PDSCH scheduling in which paging is transmitted SI-RNTI (system information RNTI): For PDSCH scheduling in which system information is transmitted INT-RNTI (interruption RNTI): For notifying whether to puncture PDSCH TPC-PUSCH-RNTI (transmit power control for PUSCH RNTI): For indication of power control command for PUSCH TPC-PUCCH-RNTI (transmit power control for PUCCH RNTI): For indication of power control command for PUCCH TPC-SRS-RNTI (transmit power control for SRS RNTI): For indication of power control command for SRS The above-described specified DCI formats may follow the definitions in Table 9, as shown below.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of the aggregation level L in the control resource set p and the search space sets may be expressed by Equation [1], as follows.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \left\lfloor \frac{N_{CCE,p}}{L} \right\rfloor \right\} + i \quad [1]$$

L: Aggregation level
$n_{CI}$: Carrier index
$N_{CCE,p}$: Total number 0 of CCEs present in control resource set p
$n_{s,f}^{\mu}$: Slot index
$M_{p,s,max}^{(L)}$: Number of PDCCH candidates of aggregation level L
$m_{s,n_{CI}}$: 0, . . . , $M_{p,s,max}^{(L)}-1$: PDCCH candidate index of aggregation level L
i=0, . . . , L−1
$Y_{p,n_{s,f}^{\mu}} = (A_p \cdot Y_{p,n_{s,f}^{\mu}}) \bmod D$, $Y_{p,-1} = n_{RNTI} \neq 0$, $A_0 = 39827$, $A_1 = 39829$,
A2=39839, D=65537
$N_{RNTI}$: UE identity
$Y_{-}(p, n_{s,f}^{\mu})$ may correspond to 0 in the case of common search space.
$Y_{-}(p, n_{s,f}^{\mu})$ may correspond to a value changing according to UE identity (C-RNTI or ID configured to UE by base station) and time index in the case of UE-specific search space.

In 5G, because a plurality of search space sets are configurable with different parameters such as those provided above in Table 8, a group of search space sets monitored by the UE may be changed at each time point.

Figure 6:
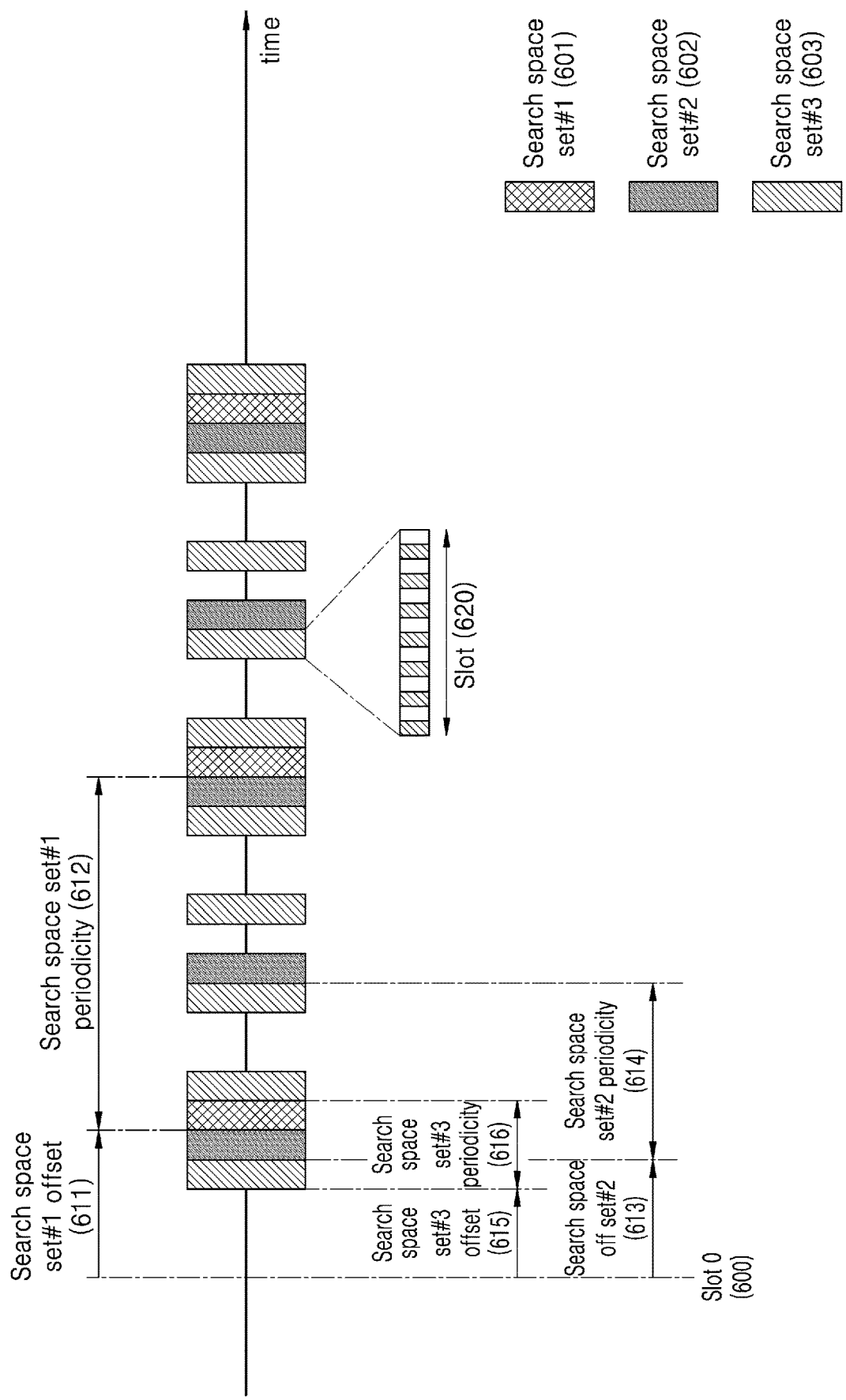
FIG. 6 illustrates configuration of search space sets for downlink control channel monitoring in 5G, according to an embodiment.

FIG. 6 illustrates configuration of search space sets for downlink control channel monitoring in 5G, according to an embodiment.

In FIG. 6, search space set #1 601 is configured to offset 611 and a periodicity 612 with slot 0 600 as a start point, search space set #2 602 is configured to offset 613 and periodicity 614 with slot 0 600 as a start point, and search space set #3 603 is configured to offset 615 and periodicity 616 with slot 0 600 as a start point. When the offsets and the periodicities described above are different from each other, the UE may monitor all of search space set #1, search space set #2, and search space set #3 in a specific slot, may monitor two of search space set #1, search space set #2, and search space set #3 in a specific slot, and may monitor one of search space set #1, search space set #2, and search space set #3 in a specific slot. In FIG. 6, the UE may receive a configuration for an OFDM symbol in which a search space set to be monitored is located in slot 620. FIG. 6 illustrates when the search space set is located every two OFDM symbols.

When a plurality of search space sets is configured in the UE, the following conditions may be considered in the method of determining the search space set to be monitored by the UE.

Condition 1: Limitation to Maximum Number of PDCCH Candidates

The number of PDCCH candidates capable of being monitored per slot does not exceed $M^{\mu}$. $M^{\mu}$ may be defined as the maximum number of PDCCH candidates per slot in a cell configured with a subcarrier spacing of $15 \cdot 2^{\mu}$ kHz and may be defined as shown in Table 10, as follows.

TABLE 10

| μ | Maximum number of PDCCH candidates per slot and per serving cell ($M^{\mu}$) |
| --- | --- |
| 0 | 44 |
| 1 | 36 |
| 2 | 22 |
| 3 | 20 |

Condition 2: Limitation to Maximum Number of CCEs

The number of CCEs constituting the entire search space per slot does not exceed $C^{\mu}$. In this case, the entire search space refers to the entire set of CCEs corresponding to the union area of the search space sets. $C^{\mu}$ may be defined as the maximum number of CCEs per slot in a cell configured with a subcarrier spacing of $15 \cdot 2^{\mu}$ kHz and may be defined as shown in Table 11, as follows.

TABLE 11

| μ | Maximum number of CCEs per slot and per serving cell ($C^{\mu}$) |
| --- | --- |
| 0 | 56 |
| 1 | 56 |
| 2 | 48 |
| 3 | 32 |

For convenience of description, a situation in which both of Conditions 1 and 2 are satisfied at a specific time point is defined as "Condition A." Therefore, not satisfying Condition A may refer to not satisfying at least one of Condition 1 and Condition 2.

Condition A may not be satisfied at a specific time point according to the configuration of the search space sets of the base station. When Condition A is not satisfied at a specific point in time, the UE may select and monitor only a part of the search space sets configured to satisfy Condition A at a corresponding time point, and the base station may transmit a PDCCH to the selected search space set.

Method 1 below may be followed for selecting some search spaces from the entire configured search space sets.

Method 1

When Condition A for PDCCH is not satisfied at a specific time point (slot),

The UE (or the base station) may preferentially select a search space set, in which a search space type is configured as a common search space among search space sets existing at a corresponding time point, over a search space set configured as a UE-specific search space.

When all the search space sets configured as the common search space are selected (that is, when Condition A is satisfied even after selecting all the search spaces configured as the common search spaces), the UE (or the base station) may select the search space sets configured as the UE-specific search space. In this case, when there is a plurality of search space sets configured as the UE-specific search space, a search space set having a lower search space set index may have a higher priority. The UE (or the base station) may select the UE-specific search space sets in consideration of priority within a range in which Condition A is satisfied In the 5G communication system, various transmission and reception related parameters may be adjusted by L1 signaling so as to reduce power consumption of the UE. For example, at least one of the parameters or a combination of one or more of the parameters in Table 12, shown below, may be controlled by L1 signaling.

TABLE 12

PDCCH related configuration parameters (PDCCH monitoring periodicity, number of times of blind decoding, aggregation level (AL), monitoring occasion, PDCCH monitoring or non-monitoring, etc.)
BWP related configuration parameters (BWP index, bandwidth size of BWP, etc.)
CA related configuration parameters (CC index, CC activation or deactivation indicator, etc)
- DRX related configuration parameters (DRX periodicity, DRX timer related parameter (onDurationTimer, InactivityTimer, HARQ-RTT-Timer, RetransmissionTimer), etc.)
Antenna related configuration parameters (number of layers, number of antenna ports, number of antenna panels, etc.)
Time domain resource assignment related configuration information (PDCCH-to-PDSCH timing K0, PDCCH-to-PUSCH timing K2)
HARQ timing related configuration information (PDSCH-to-HARQ timing)
CSI-RS configuration information The L1 signaling for reducing power consumption of the UE may be referred to as a power saving signal (PoSS).

The L1 signaling may include a WUS indicating to perform monitoring on the PDCCH of the UE, a signal (referred to as a go-to-sleep signal (GTS)) indicating not to perform monitoring on the PDCCH, or a PoSS. The base station may transmit a WUS to the UE, and the UE may monitor the PDCCH from the time point after the WUS is detected. As another example, the base station may transmit a GTS to the UE, and the UE may not perform monitoring on the PDCCH for a specific time from the time point after the GTS is detected.

As another example, the base station may configure M≥1) transmission and reception related parameters (e.g., a parameter value composed of one or more of the parameters of Table 9) to the UE through higher layer signaling and may notify the UE of the M transmission and reception related parameters as an indicator of log 2(M) bits. For example, as shown in Table 13 below, a total of four parameter combinations (PowerSavingMode #1, PowerSavingMode #2, PowerSavingMode #3, and PowerSavingMode #4) may be configured as higher layer signaling, and the four parameter combinations may be notified to the UE as an L1 indicator of 2 bits.

TABLE 13

| Bit | Contents |
|---|---|
| 00 | PowerSavingMode# 1 (configured by higher layer) |
| 01 | PowerSavingMode# 2 (configured by higher layer) |
| 10 | PowerSavingMode# 3 (configured by higher layer) |
| 11 | PowerSavingMode# 4 (configured by higher layer) |

In this case, PowerSavingMode #X (X=1, 2, 3, 4) may correspond to configuration information about various transmission and reception related parameters (one of the parameters of Table 12 or a combination of one or more of the parameters in Table 12). That is, PowerSavingMode #X may be configured as follows. However, the disclosure is not limited thereto.

PowerSavingMode #X={PDCCH related configuration #X, BWP related configuration #X, CA related configuration #X, DRX related configuration #X, antenna related configuration #X, time domain resource assignment related configuration #X, HARQ timing related configuration #X, CSI-RS configuration #X, uplink power control configuration #X, and other transmission and reception related configuration information #X}

The base station may transmit the power saving indicator to the UE as the power saving signal for the purpose of reducing power consumption, and the UE may control a transmission and reception operation based on contents of the power saving indicator transmitted as the received power saving signal, such as changing and applying the transmission and reception parameter to the indicated parameter.

Herein, when the configuration for reducing power consumption is indicated to the UE through the L1 indicator, the UE provides a method of transmitting an uplink control channel.

Figure 7:
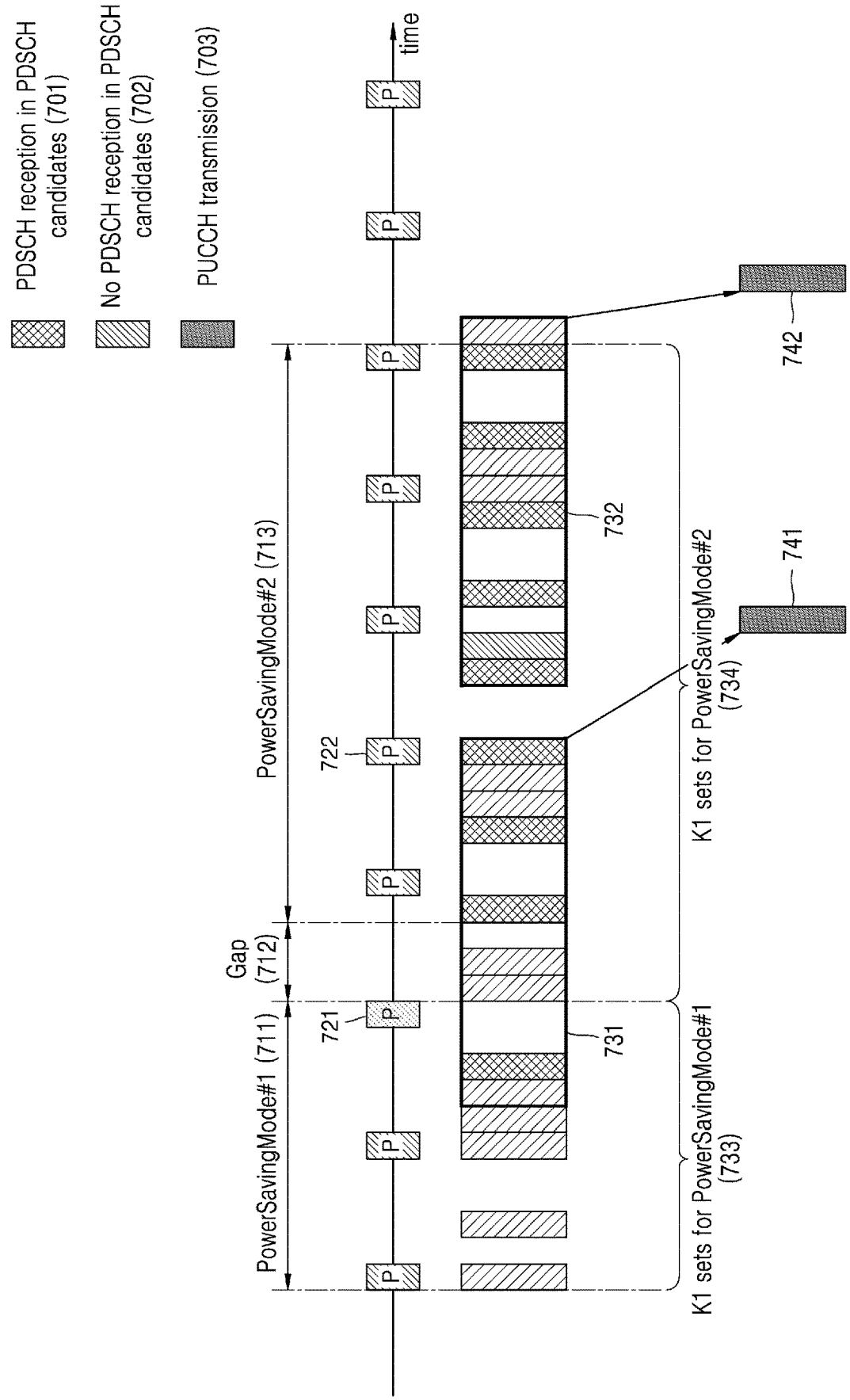
FIG. 7 illustrates a physical uplink control channel (PUCCH) transmission scheme of a UE, according to a first embodiment.

FIG. 7 illustrates a PUCCH transmission scheme of a UE, according to a first embodiment.

FIG. 7 illustrates a method of indicating L1 signaling by configuration of PowerSavingMode #1 and PowerSavingMode #2 in 5G and transmitting an uplink control channel including a HARQ-ACK for a downlink data channel according to the configuration.

In FIG. 7, two different power saving modes, PowerSavingMode #1 711 and PowerSavingMode #2 713, may be configured in the UE by the base station. Alternatively, the power saving mode may not be configured in the UE by the base station, but the power saving mode configuration may be signaled from the UE to the base station. The base station may indicate L1 signaling to the UE by referring to the power saving mode configuration from the UE. The L1 signaling may configure a specific periodicity and offset from the base station to the UE as a higher layer signal and may be transmitted from the base station based on the configuration of the higher layer signal. The UE may attempt to receive the L1 signaling based on the configuration of the higher layer signal (721 or 722). In FIG. 7, the L1 signaling may be received by the UE (721), and the UE may receive a change of a power saving mode from the base station. Alternatively, even when the L1 signaling is not transmitted, the UE may attempt to receive the L1 signaling as configured by the specific period and offset (722).

When the UE is operating in PowerSavingMode #1 711, when the UE receives the L1 signaling 721 for changing the power saving mode, a gap 712 may be previously configured as an upper signal by the base station or may be defined in a standard, by considering such information as the processing time for decoding the L1 signaling 721, and the time for changing the UE configuration according to the change of the power saving mode. After the gap 712, the UE operates in PowerSavingMode #2 712 as indicated by the L1 signaling 721. In this case, different K1 values may be configured according to the power saving mode.

K1 is configuration information for HARQ-ACK transmission. When the UE transmits an uplink control channel (PUCCH) including an HARQ-ACK by configuring a semi-static HARQ-ACK codebook (741 or 742), K1 may refer to information about generation of the HARQ-ACK codebook on the assumption that PDSCHs are received in a few previous slots based on a PUCCH transmission slot. For example, when the UE receives the configuration for transmitting the HARQ-ACK through the semi-static HARQ-ACK codebook and K1 received as the higher layer signal is K1={3, 6, 9, 10}, the UE generates the HARQ-ACK codebook in the order of a 10th previous slot, a 9th previous slot, a 6th previous slot, and a 3rd previous slot based on the PUCCH transmission slot. When the PDSCH is received, an acknowledgement (ACK) or negative ACK (NACK) is mapped according to whether decoding is successful. However, when the PDSCH is not received, the NACK is mapped. For K1 values, different sets may be configured from the base station according to the power saving mode. When different sets are configured from the base station and the HARQ-ACK for the PDSCH received during a duration in which PowerSavingMode #1 711 is applied has to be transmitted during a duration to which PowerSavingMode #2 713 is applied, it is ambiguous to know the K1 set upon which the HARQ-ACK codebook is generated.

Therefore, when the UE receives at least two power saving modes, the UE may configure a new K1 set by union of a K1 set 733 for PowerSavingMode #1 and a K1 set 734 for PowerSavingMode #2, generate a HARQ-ACK codebook based on the new K1 set, and transmit a PUCCH.

As another method, when the UE receives at least two power saving modes, the UE may always expect to receive only a dynamic HARQ-ACK codebook configuration as a higher layer signal, sequentially generate a HARQ-ACK codebook based on a counter downlink assignment index (DAI) and a total DAI of the PDCCH, and transmit a PUCCH.

As another method, when the UE receives at least two power saving modes and receives the semi-static HARQ-ACK codebook configuration as the higher layer signal, the UE may expect that all HARQ-ACKs for the PDSCH received in a specific power saving mode have to be transmitted before the reception of the L1 signaling in which the power saving mode is changed. Therefore, when the L1 signaling is received before all HARQ-ACKs are transmitted, the UE may not apply the power saving mode due to the indication of the L1 signaling. However, the disclosure is not limited to the above-described examples.

Figure 8:
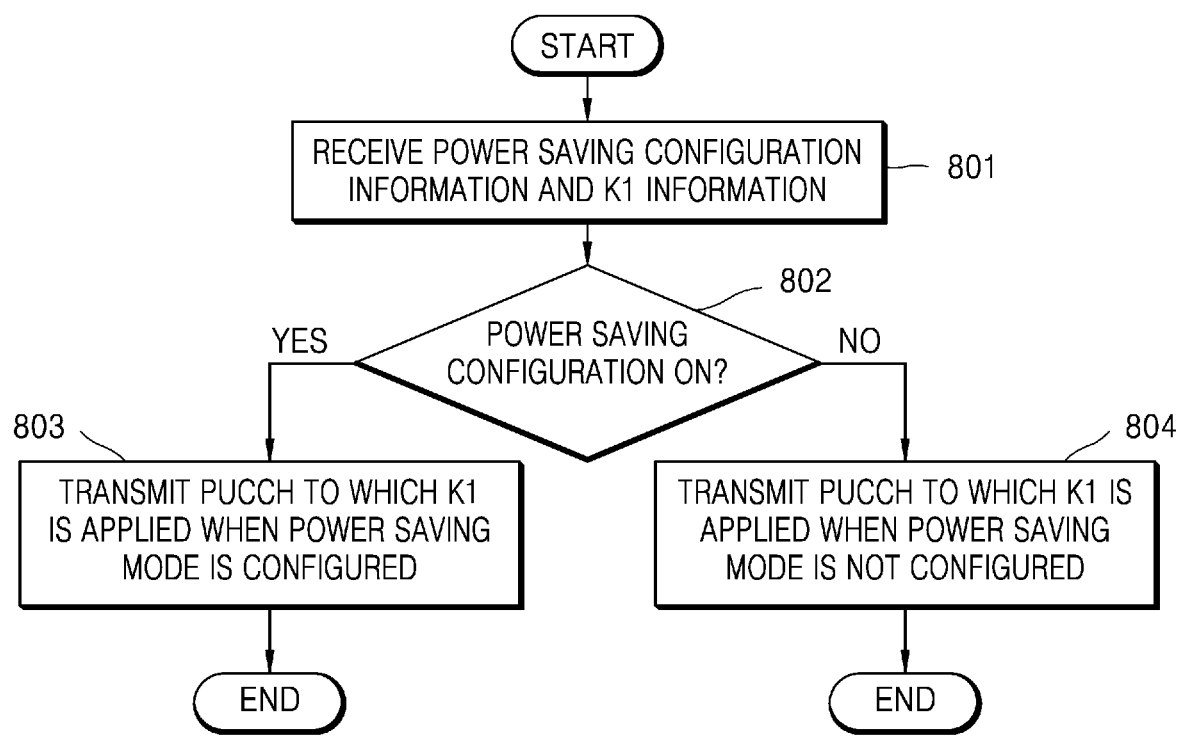
FIG. 8 illustrates a UE procedure according to a first embodiment.

FIG. 8 illustrates a UE procedure according to the first embodiment.

In step 801, the UE receives, from the base station, configuration information necessary for applying the power saving mode as described with reference to FIG. 7. The UE receives configuration information about a set of K1 values necessary for HARQ-ACK transmission through an uplink control channel and receives configuration information about whether to apply a semi-static HARQ-ACK codebook or a dynamic HARQ-ACK codebook so as to transmit an HARQ-ACK. The UE may receive, from the base station, configuration information necessary for downlink control channel reception, downlink data channel reception, and uplink control channel transmission, in addition to the above-described configuration information.

In step 802, the UE receives information from which the UE determines whether the power saving mode configuration received in step 801 is on. The UE may determine that the UE is on simultaneously as when the power saving mode is configured in step 801, and the UE may determine that the power saving mode is on through a different signal separately from the power saving mode configuration. In other words, the UE may identify or determine whether a power saving mode is applied. When a plurality of power saving modes is configured, a power saving mode to be applied may be configured as a higher layer signal before the L1 signaling is received in FIG. 8 and may be defined in a standard.

In step 803, when the UE determines in step 802 that the power saving mode is on, the UE transmits a PUCCH including the HARQ-ACK to which the K1 set is applied when the power saving mode is configured. That is, as described above with reference to FIG. 8, the UE configures a new K1 set by union of the K1 sets configured in the respective power saving modes, generates a HARQ-ACK codebook based on the new K1 set, and transmits a PUCCH. In step 804, when the UE determines in step 802 that the power saving mode is off, the UE generates a HARQ-ACK codebook based on the K1 set to be applied when the power saving mode is not configured, and transmits a PUCCH.

Figure 9:
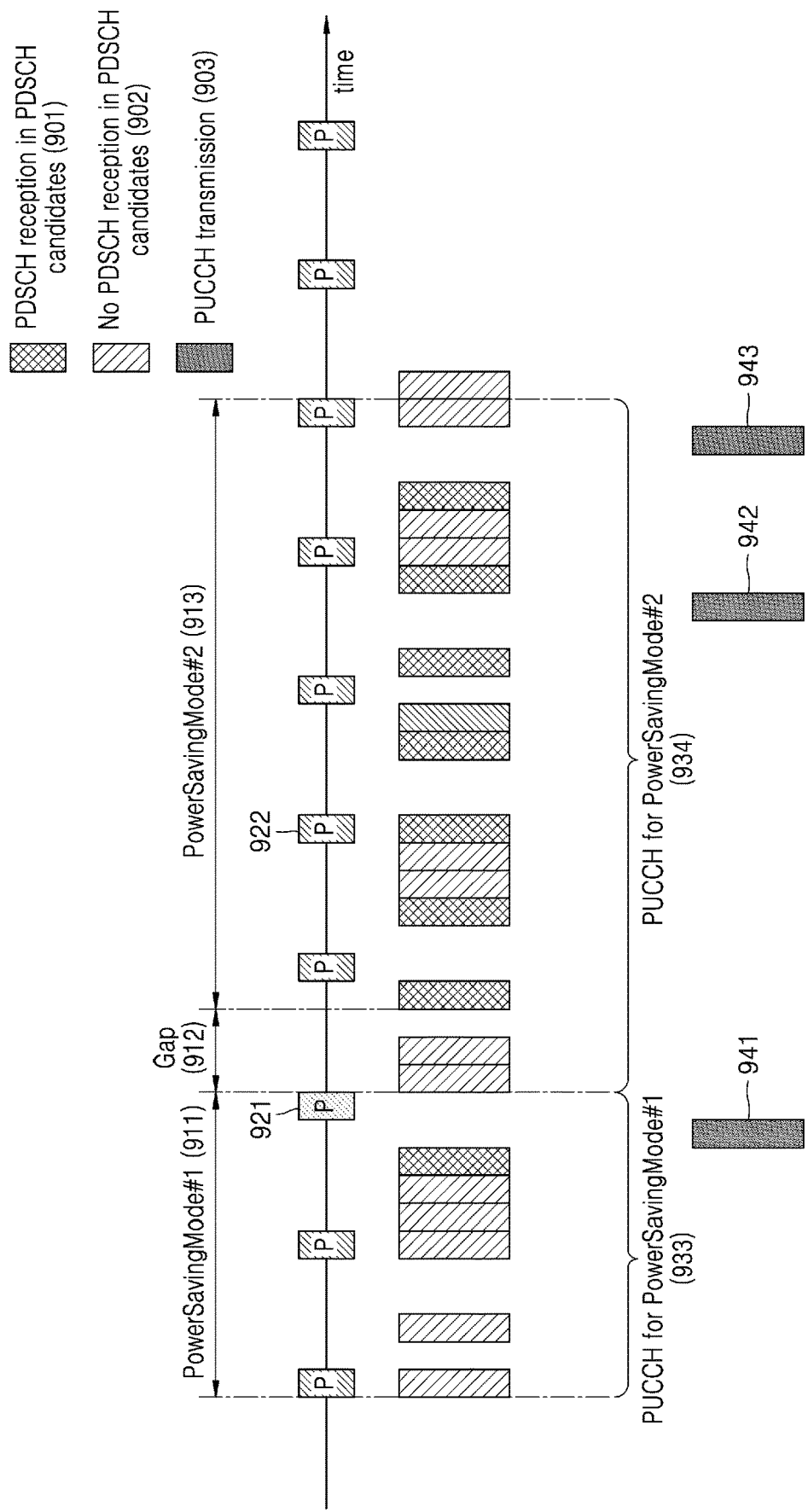
FIG. 9 illustrates a PUCCH transmission scheme of a UE, according to a second embodiment.

FIG. 9 illustrates a PUCCH transmission scheme of a UE, according to a second embodiment.

FIG. 9 illustrates a method of indicating L1 signaling by configuration of PowerSavingMode #1 and PowerSavingMode #2 in 5G and transmitting an HARQ-ACK for a downlink data channel through an uplink control channel, to which a power saving scheme is applied, according to the configuration.

In FIG. 9, two different power saving modes, PowerSavingMode #1 911 and PowerSavingMode #2 913, may be configured in the UE by the base station. Alternatively, the power saving mode may not be configured in the UE by the base station, but the power saving mode configuration may be signaled from the UE to the base station. The base station may indicate L1 signaling to the UE by referring to the power saving mode configuration from the UE. The L1 signaling may configure a specific periodicity and offset from the base station to the UE as a higher layer signal and may be transmitted from the base station based on the configuration of the higher layer signal, and the UE may attempt to receive the L1 signaling based on the configuration of the higher layer signal (921 or 922). In FIG. 9, the L1 signaling may be received by the UE (921), and the UE may receive a change of a power saving mode from the base station. Alternatively, even when the L1 signaling is not transmitted, the UE may attempt to receive the L1 signaling as configured by the specific period and offset (922).

When the UE is operating in PowerSavingMode #1 911 and the UE receives the L1 signaling 921 for changing the power saving mode, a gap 912 may be previously configured as an upper signal by the base station or may be defined in a standard, by considering such information as the processing time for decoding the L1 signaling 921, and the time for changing the UE configuration according to the change of the power saving mode. After the gap 912, the UE operates in PowerSavingMode #2 913 as indicated by the L1 signaling 921. In this case, the transmission resource and the transmission format of the uplink control channel may be previously configured according to the power saving mode. That is, in order to reduce power consumption for PUCCH transmission, the UE may multiplex HARQ-ACK and channel information with respect to the PDSCH received before the PUCCH transmission and transmit the HARQ-ACK and the channel information by using the configured resource and format. Therefore, information about which slot the HARQ-ACK and the CSI are multiplexed and to which slot the HARQ-ACK and the CSI are multiplexed may also be previously configured from the base station before the PUCCH transmission.

The PUCCH transmission method may be individually configured according to each power saving mode. When the power saving mode to be applied by L1 signaling is changed, the UE transmits the PUCCH according to the PUCCH transmission method configured for the changed power saving mode. The PUCCH transmission method may be equally applied, regardless of whether the HARQ-ACK codebook generation method is the dynamic HARQ-ACK codebook or the semi-static HARQ-ACK codebook.

Figure 10:
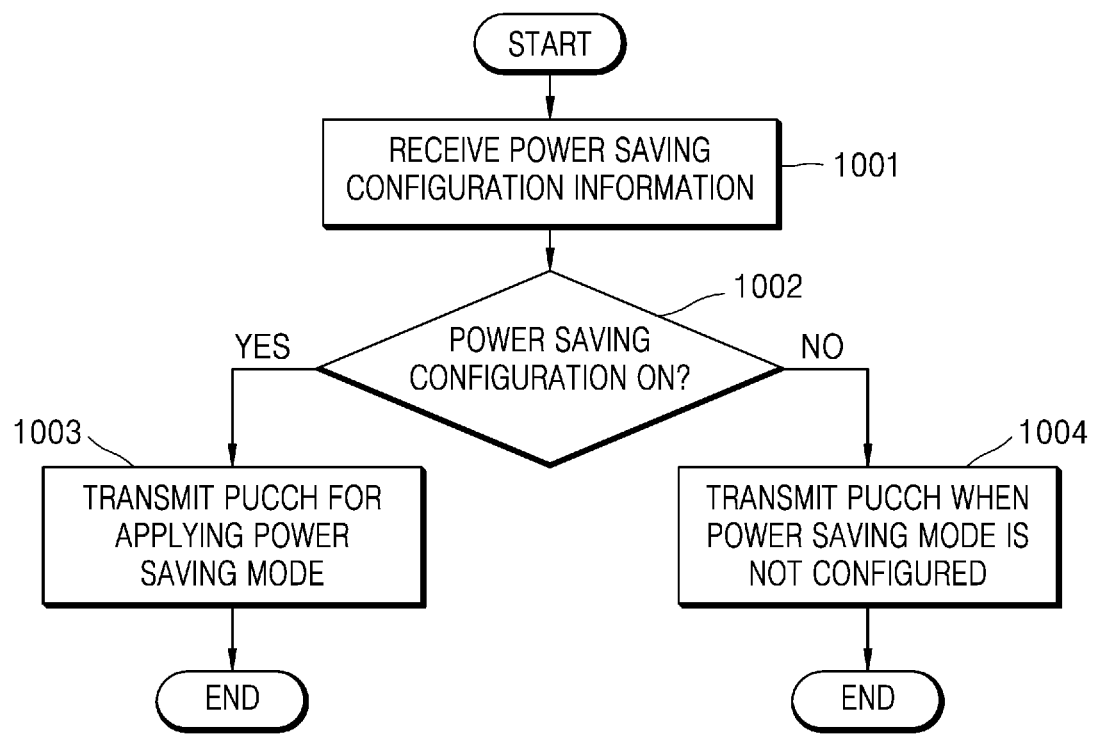
FIG. 10 illustrates a UE procedure according to a second embodiment.

FIG. 10 illustrates a UE procedure according to a second embodiment.

In step 1001, the UE receives, from the base station, configuration information necessary for applying the power saving mode as described with reference to FIG. 9. As described above with reference to FIG. 9, the UE receives such information as the configuration information necessary for the HARQ-ACK and CSI transmission through the uplink control channel, the transmission resource and transmission format of the uplink control channel for each power saving mode, information about from which slot the HARQ-ACK and the CSI are multiplexed and to which slot the HARQ-ACK and the CSI are multiplexed before the PUCCH transmission, and the configuration information about whether to apply the semi-static HARQ-ACK codebook or the dynamic HARQ-ACK codebook so as to transmit the HARQ-ACK. The UE may receive, from the base station, configuration information necessary for downlink control channel reception, downlink data channel reception, and uplink control channel transmission, in addition to the above-described configuration information.

In step 1002, the UE receives information from which the UE determines whether the power saving mode configuration received in step 1001 is on. The UE may determine that the UE is on simultaneously as when the power saving mode is configured in step 1001, and the UE may determine that the power saving mode is on through a different signal separately from the power saving mode configuration. In other words, the UE may identify or determine whether a power saving mode is applied. When a plurality of power saving modes is configured, a power saving mode to be applied may be configured as a higher layer signal before the L1 signaling is received in FIG. 9 and may be defined in a standard.

In step 1003, when the UE determines in step 1002 that the power saving mode is on, the UE transmits a PUCCH for applying power consumption reduction. That is, as described above with reference to FIG. 9, the PUCCH is transmitted by taking into account the PUCCH transmission resource, the format, the slot duration for HARQ-ACK and CSI multiplexing, which are configured for each power saving mode. In step 1004, when the UE determines in step 1002 that the power saving mode is off, the UE transmits a PUCCH by using a general PUCCH transmission method for applying the power saving mode when the power saving mode is not configured.

Figure 11:
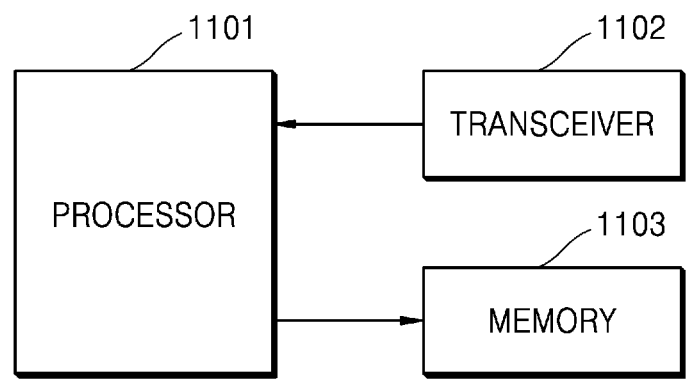
FIG. 11 illustrates an internal structure of a UE, according to an embodiment.

FIG. 11 illustrates an internal structure of a UE, according to an embodiment. As illustrated in FIG. 11, the UE of the disclosure may include, but is not limited to, a processor 1101, a transceiver 1102, and a memory 1103. For example, the UE may include more elements or fewer elements than the above-described elements. The processor 1101, the transceiver 1102, and the memory 1103 may be implemented in the form of a single chip.

The processor 1101 may control a series of processes so that the UE operates according to the above-described embodiments. For example, the elements of the UE may be controlled so as to perform the UE operations or the like of the disclosure related to the power saving mode, such as the capability report for reducing the power consumption of the UE and the reception of the power saving mode or the like from the base station accordingly. The processor 1101 may be plural, and may execute a program stored in the memory 1103 to perform the uplink control channel transmission method for reducing the power consumption of the UE of the disclosure. For example, the processor 1101 may receive power saving configuration information from the base station, determine whether to apply the power saving mode, and transmit the uplink control channel based on a result of the determining and the configuration information. Although only some operations of the above-described embodiments have been described as examples in connection with the above-described operations, the disclosure is not limited thereto. The processor 1101 may control all processes so that the UE is enabled to operate according to all or part of the above-described embodiments.

The transceiver 1102 may transmit and receive a signal with the base station. The signal, which is transmitted and received with the base station, may include control information and data. The transceiver 1102 may include an RF transmitter that performs up-conversion and amplification on a frequency of a signal to be transmitted, and an RF receiver that performs low-noise amplification on a received signal and performs down-conversion on a frequency of the received signal. However, the elements of the transceiver 1102 are not limited to the RF transmitter and the RF receiver. The transceiver 1102 may receive a signal through a radio channel, output the signal to the processor 1101, and transmit an output signal of the processor 1101 through the radio channel.

The memory 1103 may store programs and data necessary for the operation of the UE. The memory 1103 may store control information or data included in the signal transmitted and received by the UE. The memory 1103 may be configured as a storage medium, such as read-only memory (ROM), random access memory (RAM), hard disk, compact disc-read-only memory (CD-ROM), and digital versatile disc (DVD), or a combination of these storage media. The memory 1103 may be plural, and may store a program for performing the uplink control channel transmission method for reducing the power consumption of the UE of the disclosure described above.

Figure 12:
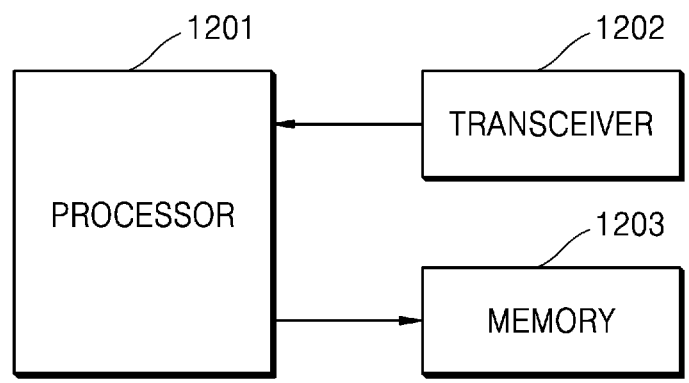
FIG. 12 illustrates an internal structure of a base station, according to an embodiment.

FIG. 12 illustrates an internal structure of a base station, according to an embodiment. As illustrated in FIG. 12, the base station of the disclosure may include, but is not limited to, a processor 1201, a transceiver 1202, and a memory 1203. For example, the base station may include more elements or fewer elements than the above-described elements. The processor 1201, the transceiver 1202, and the memory 1203 may be implemented in the form of a single chip.

The processor 1201 may control a series of processes so that the base station operates according to the above-described embodiments. For example, the elements of the base station may be controlled so as to perform the methods of the disclosure related to the power saving mode, such as the capability report of the UE for reducing the power consumption according to an embodiment, the configuration of the power saving mode, and the transmission of the power saving mode to the UE. The processor 1201 may be plural, and may execute a program stored in the memory 1203 to perform the uplink control channel transmission method for reducing the power consumption of the UE of the disclosure. For example, the processor 1201 may transmit power saving configuration information to the UE and receive the uplink control channel based on the configuration information.

Although only some operations of the above-described embodiments have been described as examples in connection with the above-described operations, the disclosure is not limited thereto. The processor 1201 may control all processes so that the base station is enabled to operate according to all or part of the above-described embodiments.

The transceiver 1202 may transmit and receive a signal with the UE. The signal may include control information and data. The transceiver 1202 may include an RF transmitter that performs up-conversion and amplification on a frequency of a signal to be transmitted, and an RF receiver that performs low-noise amplification on a received signal and performs down-conversion on a frequency of the received signal. However, the transceiver 1202 is merely an embodiment, and the elements of the transceiver 1202 are not limited to the RF transmitter and the RF receiver. The transceiver 1202 may receive a signal through a radio channel, output the signal to the processor 1201, and transmit an output signal of the processor 1201 through the radio channel.

The memory 1203 may store programs and data necessary for the operation of the base station. The memory 1203 may store control information or data included in the signal transmitted and received by the base station. The memory 1203 may be configured as a storage medium, such as read-only memory (ROM), random access memory (RAM), hard disk, compact disc ROM (CD-ROM), and digital versatile disc (DVD), or a combination of these storage media. The memory 1203 may be plural, and may store a program for performing the uplink control channel transmission method for reducing the power consumption of the UE of the disclosure described above.

The methods according to the embodiments herein may be implemented by hardware, software, or a combination of hardware and software.

When implemented by software, a computer-readable storage medium for storing one or more programs (software modules) may be provided. One or more programs stored in the computer-readable storage medium are configured to be executable by one or more processors in an electronic device. One or more programs include instructions that cause the electronic device to execute the methods according to the embodiments.

The one or more programs (software modules, software, etc.) may be stored in a RAM, non-volatile memory including flash memory, ROM, electrically erasable programmable read only memory (EEPROM), magnetic disc storage device, CD-ROM, DVDs, other types of optical storage devices, or magnetic cassette. Alternatively, the one or more programs may be stored in a memory provided by a combination of all or part of these devices. Each memory may include a plurality of configured memories.

The one or more programs may be stored in an attachable storage device that is accessible through a communication network such as Internet, intranet, local area network (LAN), wide LAN (WLAN), or storage area network (SAN), or a communication network provided by a combination thereof. These storage devices may be connected through an external port to a device that performs the embodiments of the disclosure. A separate storage device on the communication network may access the device that performs the embodiment of the disclosure.

Herein, the elements included in the disclosure have been expressed in the singular or plural form according to the embodiments. However, the expression in the singular or plural form is appropriately selected according to the suggested situations for convenience of explanation and is not intended to limit the disclosure to the single or plural elements. Even when a certain element is expressed in the plural form, the element may be provided with a single element, and even when a certain element is expressed in the singular form, the element may be provided with a plurality of elements.

As described above, it is possible to provide the apparatus and method capable of effectively providing services in the mobile communication system.

It will be obvious to those of ordinary skill in the art that other modifications based on the technical idea of the disclosure may be made. The embodiments of the disclosure may be operated in combination with each other as necessary. For example, some portions of one embodiment of the disclosure and some portions of another embodiment of the disclosure may be combined with each other so that the base station and the UE may be operated. The embodiments of the disclosure may be applicable to other communication systems, and other modifications based on the technical idea of the embodiments of the disclosure may be made.

While the disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method of transmitting an uplink control channel according to a power saving mode of a user equipment (UE), the method comprising:
    receiving configuration information about at least one power saving mode;
    applying a power saving mode among the at least one power saving mode based on the configuration information;
    receiving layer 1 (L1) signaling for changing the applied power saving mode and gap information;
    changing the applied power saving mode based on the L1 signaling and the gap information; and
    transmitting an uplink control channel based on configuration information corresponding to the changed power saving mode,
    wherein the gap information includes information regarding a processing time for decoding the L1 signaling and information regarding a time necessary for changing a configuration for transmission of an uplink control channel.

2. The method of claim 1,
wherein the configuration information about the power saving mode comprises configuration information about a hybrid automatic repeat request acknowledgement/negative acknowledgement (HARQ-ACK/NACK) signal transmitted through the uplink control channel.

3. The method of claim 1,
wherein the configuration information about the power saving mode comprises resource information and transmission format information that are to be used for transmission of the uplink control channel.

4. The method of claim 2,
wherein the configuration information about the HARQ-ACK/NACK signal comprises at least one of information about a set of slots corresponding to ACK/NACK information included in an HARQ-ACK/NACK codebook to be transmitted through the uplink control channel and information about whether to multiplex the HARQ-ACK/NACK signal with channel state information (CSI) and transmit a resultant signal of the multiplexing.

5. The method of claim 4,
wherein, when configuration information about two or more power saving modes is received, the information about the set of slots corresponding to the ACK/NACK information included in the HARQ-ACK/NACK codebook is a combination of a set of slots corresponding to ACK/NACK information included in an HARQ-ACK codebook to be transmitted through the uplink control channel corresponding to a first power saving mode and a set of slots corresponding to ACK/NACK information included in an HARQ-ACK codebook to be transmitted through the uplink control channel corresponding to a second power saving mode.

6. The method of claim 4,
wherein, when configuration information about two or more power saving modes is received, the information about the set of slots corresponding to the ACK/NACK information included in the HARQ-ACK/NACK codebook is determined based on at least one of a counter downlink assignment indication (DAI) or a total DAI of a downlink control channel.

7. The method of claim 1,
wherein, when the HARQ-ACK/NACK information to be transmitted based on the configuration information about the power saving mode before the changing remains, the power saving mode based on the received L1 signaling is not applied.

8. The method of claim 1,
wherein the power saving mode is applied by receiving the configuration information about the at least one power saving mode or by receiving a higher layer signal.

9. A user equipment (UE) for transmitting an uplink control channel according to a power saving mode, the UE comprising:
a transceiver; and
a processor connected to the transceiver and configured to receive configuration information about at least one power saving mode, apply a power saving mode among the at least one power saving mode based on the configuration information, receive layer 1 (L1) signaling for changing the applied power saving mode and gap information, change the applied power saving mode based on the L1 signaling and the gap information, and transmit an uplink control channel based on configuration information corresponding to the changed power saving mode,
wherein the gap information includes information regarding a processing time for decoding the L1 signaling and information regarding a time necessary for changing a configuration for transmission of an uplink control channel.

10. The UE of claim 9,
wherein the configuration information about the power saving mode comprises configuration information about a hybrid automatic repeat request acknowledgement/negative acknowledgement (HARQ-ACK/NACK) signal transmitted through the uplink control channel.

11. The UE of claim 9,
wherein the configuration information about the power saving mode comprises resource information and transmission format information that are to be used for transmission of the uplink control channel.

12. The UE of claim 10,
wherein the configuration information about the HARQ-ACK/NACK signal comprises at least one of information about a set of slots corresponding to ACK/NACK information included in an HARQ-ACK/NACK codebook to be transmitted through the uplink control channel and information about whether to multiplex the HARQ-ACK/NACK signal with channel state information (CSI) and transmit a resultant signal of the multiplexing.

13. The UE of claim 12,
wherein, when configuration information about two or more power saving modes is received, the information about the set of slots corresponding to the ACK/NACK information included in the HARQ-ACK/NACK codebook is a combination of a set of slots corresponding to ACK/NACK information included in an HARQ-ACK codebook to be transmitted through the uplink control channel corresponding to a first power saving mode and a set of slots corresponding to ACK/NACK information included in an HARQ-ACK codebook to be transmitted through the uplink control channel corresponding to a second power saving mode.

14. The UE of claim 12,
wherein, when configuration information about two or more power saving modes is received, the information about the set of slots corresponding to the ACK/NACK information included in the HARQ-ACK/NACK codebook is determined based on at least one of a counter downlink assignment indication (DAI) and a total DAI of a downlink control channel.

15. The UE of claim 9,
wherein, when the HARQ-ACK/NACK information to be transmitted based on the configuration information about the power saving mode before the changing remains, the processor is further configured not to apply the power saving mode based on the received L1 signaling.

16. The UE of claim 9,
wherein the processor is further configured to apply the power saving mode by receiving the configuration information about the at least one power saving mode or by receiving a higher layer signal.

* * * * *